US011410182B2

(12) United States Patent
Dokai

(10) Patent No.: US 11,410,182 B2
(45) Date of Patent: Aug. 9, 2022

(54) IMAGE FORMING APPARATUS, SYSTEM, METHOD, AND STORAGE MEDIUM

(71) Applicant: CANON KABUSHIKI KAISHA, Tokyo (JP)

(72) Inventor: Hitoshi Dokai, Hachioji (JP)

(73) Assignee: Canon Kabushiki Kaisha, Tokyo (JP)

( * ) Notice: Subject to any disclaimer, the term of this patent is extended or adjusted under 35 U.S.C. 154(b) by 934 days.

(21) Appl. No.: 15/430,175

(22) Filed: Feb. 10, 2017

(65) Prior Publication Data

US 2017/0243229 A1    Aug. 24, 2017

(30) Foreign Application Priority Data

Feb. 23, 2016 (JP) .............................. JP2016-032475

(51) Int. Cl.
*G06Q 30/00* (2012.01)
*G06F 21/10* (2013.01)

(52) U.S. Cl.
CPC ......... *G06Q 30/018* (2013.01); *G06F 21/105* (2013.01); *G06F 2221/0771* (2013.01); *G06Q 2220/18* (2013.01)

(58) Field of Classification Search
None
See application file for complete search history.

(56) References Cited

U.S. PATENT DOCUMENTS 6,226,618 B1 *  5/2001  Downs ................... G06F 21/10
                                                  705/51

7,117,443 B1 *  10/2006  Zilka ...................... G06Q 10/10
                                                  715/739

(Continued)

FOREIGN PATENT DOCUMENTS

| CN | 102667790 B | * | 3/2017 | ............. G06F 21/10 |
| JP | 2009026317 A | * | 2/2009 | |
| JP | 2012-221054 A | | 11/2012 | |

OTHER PUBLICATIONS

Zhaofeng Ma, "Digital rights management: Model, technology and application," in China Communications, vol. 14, No. 6, pp. 156-167, 2017, doi: 10.1109/CC.2017.7961371. https://ieeexplore.ieee.org/abstract/document/7961371 (Year: 2017).*

*Primary Examiner* — El Mehdi Oussir
(74) *Attorney, Agent, or Firm* — Canon U.S.A., Inc. IP Division

(57) ABSTRACT

An image forming apparatus that is capable of communicating with a license management server configured to generate a license and that validates an application corresponding to the license by applying the license determines whether current timing has exceeded timing set in the applied license, requests, in response to determining that current timing has exceeded timing set in the applied license, a new license for the application from the license management server, applies the acquired new license, adds, in a case where the new license is not yet applied and the applied license has expired, the application to a screen for receiving an instruction for renewing the license from a user, and requests, apart from requesting the new license in response to a result of the determination, the new license in response to an instruction for renewing the license being received via the screen.

8 Claims, 14 Drawing Sheets

(56) References Cited

U.S. PATENT DOCUMENTS

| | | | | |
|---|---|---|---|---|
| 7,231,438 B1* | 6/2007 | Kikuchi | H04L 41/12 | 709/223 |
| 8,090,662 B2* | 1/2012 | Pence | G06F 21/10 | 705/1.1 |
| 8,111,414 B2* | 2/2012 | Sato | H04N 1/00464 | 358/1.15 |
| 8,397,264 B2* | 3/2013 | Ansari | H04L 12/2818 | 725/74 |
| 10,021,264 B2* | 7/2018 | Watariuchi | H04N 1/00204 | |
| 2003/0004888 A1* | 1/2003 | Kambayashi | G11B 20/0021 | 705/59 |
| 2006/0059128 A1* | 3/2006 | Ruggle | G06Q 10/10 | |
| 2006/0106725 A1* | 5/2006 | Finley | G06F 3/04817 | 705/59 |
| 2007/0208669 A1* | 9/2007 | Rivette | G06Q 50/184 | 705/59 |
| 2010/0293622 A1* | 11/2010 | Nikitin | G06F 21/10 | 726/31 |
| 2012/0064204 A1* | 3/2012 | Davila | H04N 1/00188 | 426/231 |
| 2012/0215684 A1* | 8/2012 | Kidron | G06F 15/167 | 705/39 |
| 2013/0067463 A1* | 3/2013 | Ito | G06F 8/60 | 717/178 |
| 2013/0185197 A1* | 7/2013 | Brown | G06F 21/105 | 705/39 |
| 2013/0222829 A1* | 8/2013 | Nakashima | H04N 1/00233 | 358/1.13 |
| 2014/0040343 A1* | 2/2014 | Nickolov | H04L 69/32 | 709/201 |
| 2014/0075004 A1* | 3/2014 | Van Dusen | G06F 16/90335 | 709/223 |
| 2014/0122350 A1* | 5/2014 | Takemoto | G06Q 30/018 | 705/317 |
| 2014/0173762 A1* | 6/2014 | Sugiura | G06Q 30/00 | 726/30 |
| 2014/0218533 A1* | 8/2014 | Nerayoff | G06T 7/70 | 348/148 |
| 2014/0278555 A1* | 9/2014 | Johnson | G06Q 50/30 | 705/3 |
| 2016/0182707 A1* | 6/2016 | Gabel | H04M 1/72424 | 455/404.2 |

* cited by examiner

FIG.4

*401* LICENSE

APPLICATION IDENTIFIER: 1
DEVICE IDENTIFIER: 1
LICENSE TYPE: AUTOMATIC RENEWAL
USE START DATE: 2015/1/20
USE END DATE: 2015/2/28
RENEWAL CONFIRMATION DATE: 2015/2/20
ELECTRONIC SIGNATURE: a2349befa2384394875

800a — ID: UserA

801 — THE LICENSE IS TO BE RENEWED. IS THIS RIGHT?
· APPLICATION NAME: WORKFLOW GENERATION
· VALIDITY PERIOD: 2015/11/01 - 2015/11/31

802 — YES   803 — NO   LOGOUT

FIG.8B

800b — ID: UserA

THE LICENSE IS IN THE PROCESS OF BEING RENEWED.
PLEASE WAIT FOR A WHILE...

LOGOUT

FIG.8C

800c — ID: UserA

804 — THE LICENSE HAS BEEN RENEWED.
· APPLICATION NAME: WORKFLOW GENERATION
· VALIDITY PERIOD: 2015/12/01 - 2015/12/31

805 — OK   LOGOUT

FIG.8D

800d — ID: UserA

806 — THERE IS NO VALID LICENSE.
PLEASE CONTACT A PERSON IN CHARGE OF SERVICE.

805 — OK   LOGOUT

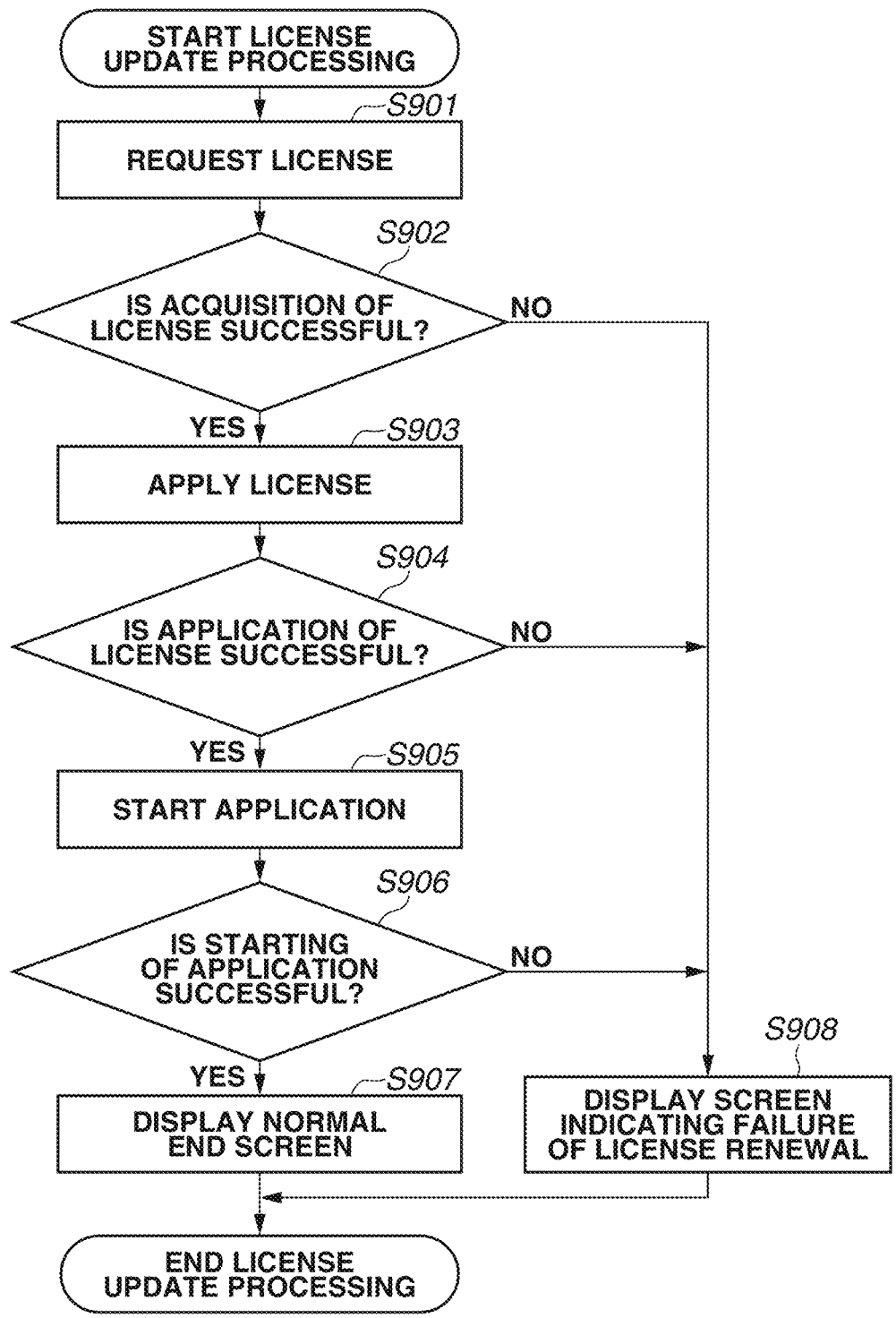

IMAGE FORMING APPARATUS, SYSTEM, METHOD, AND STORAGE MEDIUM

BACKGROUND OF THE INVENTION

Field of the Invention

Aspects of the present invention generally relate to an image forming apparatus, a system, a method, and a storage medium, each of which is configured to validate an application by applying a license.

Description of the Related Art

An image forming apparatus, which is equipped with basic functions, such as copy, print, and scan functions, as default, can be provided with an extended function as an optional extra. A user who wants to use an extended function can receive a license by purchasing a product having the extended function and use the product, as discussed in Japanese Patent Application Laid-Open No. 2012-221054.

SUMMARY OF THE INVENTION

According to an aspect of the present invention, an image forming apparatus that is capable of communicating with a license management server configured to generate a license and that validates an application corresponding to the license by applying the license includes a determination unit configured to determine whether current timing has exceeded timing set in the applied license for the application, a request unit configured to, in response to the determination unit determining that the current timing has exceeded the timing set in the applied license, request a new license for the application from the license management server so as to renew the license for the application, an application unit configured to, in response to acquiring the new license from the license management server as a result of request by the request unit, apply the acquired new license, and an addition unit configured to, in a case where the new license is not yet applied by the application unit and the applied license for the application has expired, add the application to a screen for receiving an instruction for renewing the license from a user, wherein, apart from requesting the new license in response to a result of determination by the determination unit, the request unit requests the new license in response to an instruction for renewing the license for the application being received via the screen.

Further features of the present invention will become apparent from the following description of exemplary embodiments with reference to the attached drawings.

BRIEF DESCRIPTION OF THE DRAWINGS

FIG. 4 illustrates the content of a license.

FIG. 6 illustrates a screen for displaying a list of applications the license for which has already expired.

FIGS. 8A, 8B, 8C, and 8D illustrate screens which are displayed when an instruction for renewing a license is received.

FIG. 9 is a flowchart illustrating renewal processing for a license.

DESCRIPTION OF THE EMBODIMENTS

In purchasing a product having an extended function, purchases using a model of subscription in which the function is allowed to be used for a contract period under the condition that a usage fee continues to be paid periodically can be considered. In the case of this model, in order to prevent the product from being used for a period with respect to which the usage fee is not paid, a method can be considered in which a license that is valid only within a period corresponding to the paid usage fee is issued, so that the license is required to be renewed several times during the contract period. However, in a case where, for some reason, an image forming apparatus has not performed a license renewal operation at a certain time during the period in which the renewal is required to be performed several times, such a situation occurs that the user is not able to use the intended extended function. In view of this issue, in a system for managing a product to which a model of subscription is applied, aspects of the present invention are generally directed to a procedure for enabling a user to resume the use of the product by renewing a license by the user's own operation.

According to an exemplary embodiment of the present invention, in a system for managing a product to which a model of subscription is applied, a user is enabled to resume the use of the product by renewing a license by the user's own operation.

Various exemplary embodiments, features, and aspects of the invention will be described in detail below with reference to the drawings.

Figure 1:
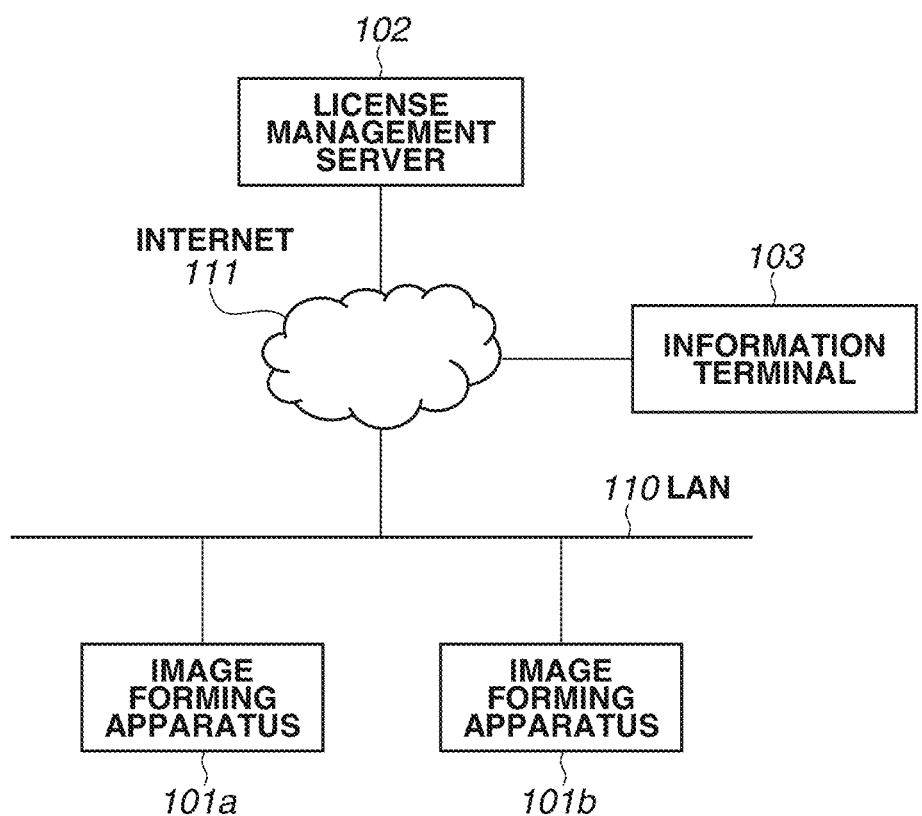
FIG. 1 illustrates an entire configuration of a license system.

FIG. 1 is a network configuration diagram illustrating the entirety of a license system according to a first exemplary embodiment. An image forming apparatus 101 (101a or 101b), which is typified by a multifunction peripheral, is an apparatus having the function to form an image. A license management server 102 is a server which manages a license for validating an application that runs on the image forming apparatus 101. The term "application" refers to a software program for enabling using en extended function and/or a standard function on the image forming apparatus 101. Data for certifying the presence of the authority to use an application is referred to as a license, and, when the license is correctly applied to the image forming apparatus 101, an application corresponding to the license is validated. The user is allowed to use the validated application. The method for applying a license can include installing the license on the image forming apparatus 101.

An execution file for running an application can be previously incorporated in the firmware of the image forming apparatus 101 or can be installed later on the image forming apparatus 101. The license management server 102 does not need to be a particular server, but can be a license management server that is present on an indefinite server, such as the structure of cloud computing. The functions which the license management server 102 provides are described in detail below with reference to FIG. 3.

An information terminal 103 is an information processing apparatus, which is typified by a personal computer. The information terminal 103 can be used to operate a web browser via a keyboard, a mouse, and a display or via a touch panel. A local area network (LAN) 110 is a network line which interconnects the image forming apparatus 101 and the external Internet 111. The Internet 111 is a network line via which the image forming apparatus 101, the license management server 102, and the information terminal 103 mentioned above are able to communicate with one another. The image forming apparatus 101 or the information terminal 103 is able to communicate with the license management server 102 via the LAN 110 and the Internet 111.

Figure 2:
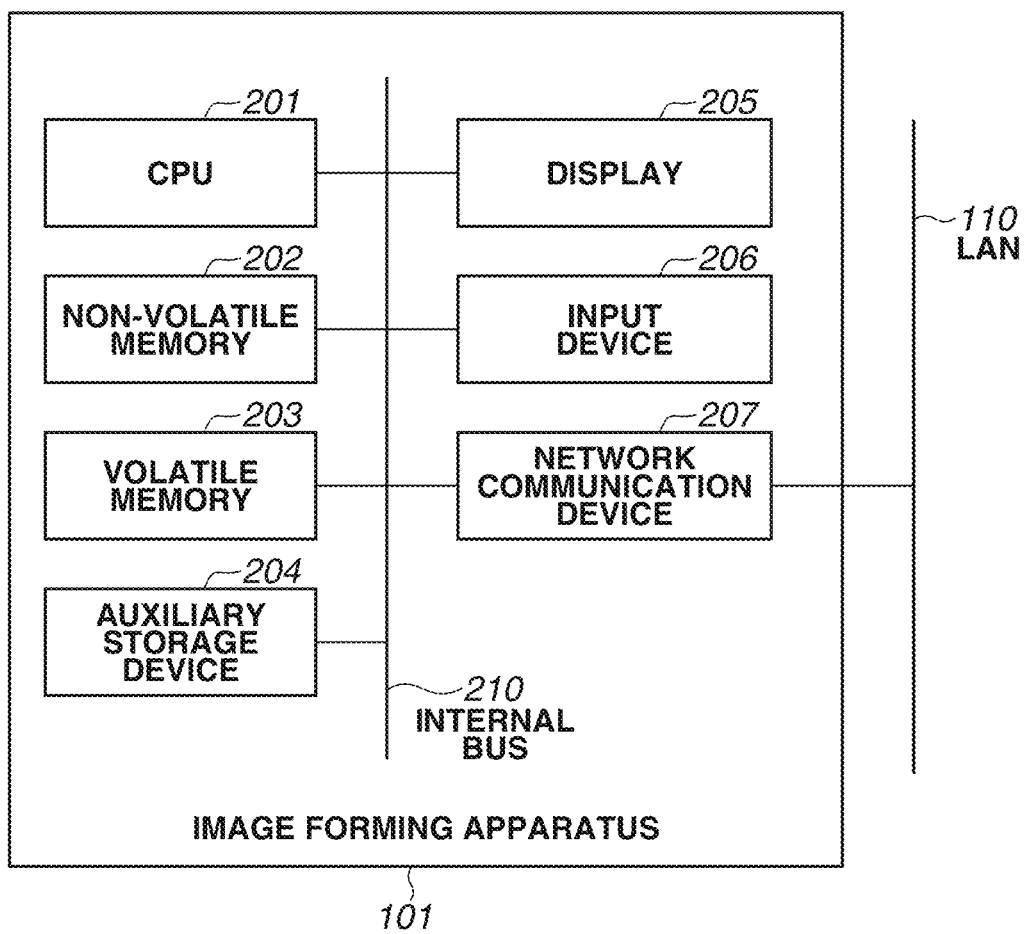
FIG. 2 illustrates a hardware configuration of an image forming apparatus.

FIG. 2 is a hardware configuration diagram of the image forming apparatus 101. A central processing unit (CPU) 201 executes programs and performs various control operations. A non-volatile memory 202, which is configured with a read-only memory (ROM), stores programs and data which are required at the initial stage in start-up processing of the apparatus. A volatile memory 203, which is configured with a random access memory (RAM), is used as a temporary storage location for programs and data. An auxiliary storage device 204, which is configured with a high-capacity storage device, such as a hard disk or a RAM drive, stores large volumes of data, retains execution codes of programs, and retains the setting values of the image forming apparatus 101. The auxiliary storage device 204 stores data required to be retained for a longer period of time as compared with the volatile memory 203. The auxiliary storage device 204 is a non-volatile storage device and is, therefore, able to continue storing data even when the image forming apparatus 101 is powered off. A display 205 is a display device used to present data to the user.

An input device 206 is a device used to receive a selection instruction from the user and to transmit the selection instruction to the programs via an internal bus 210. A network communication device 207 is a device arranged to enable the image forming apparatus 101 to communicate with another information device via a network. The internal bus 210 is a communication bus that interconnects various hardware devices in such a manner that the devices are able to communicate with one another in the image forming apparatus 101. The hardware configuration of each of the license management server 102 and the information terminal 103 is similar to that illustrated in FIG. 2, and the image forming apparatus 101 is equipped with a printing unit and/or a scanner unit (both not illustrated).

Figure 3:
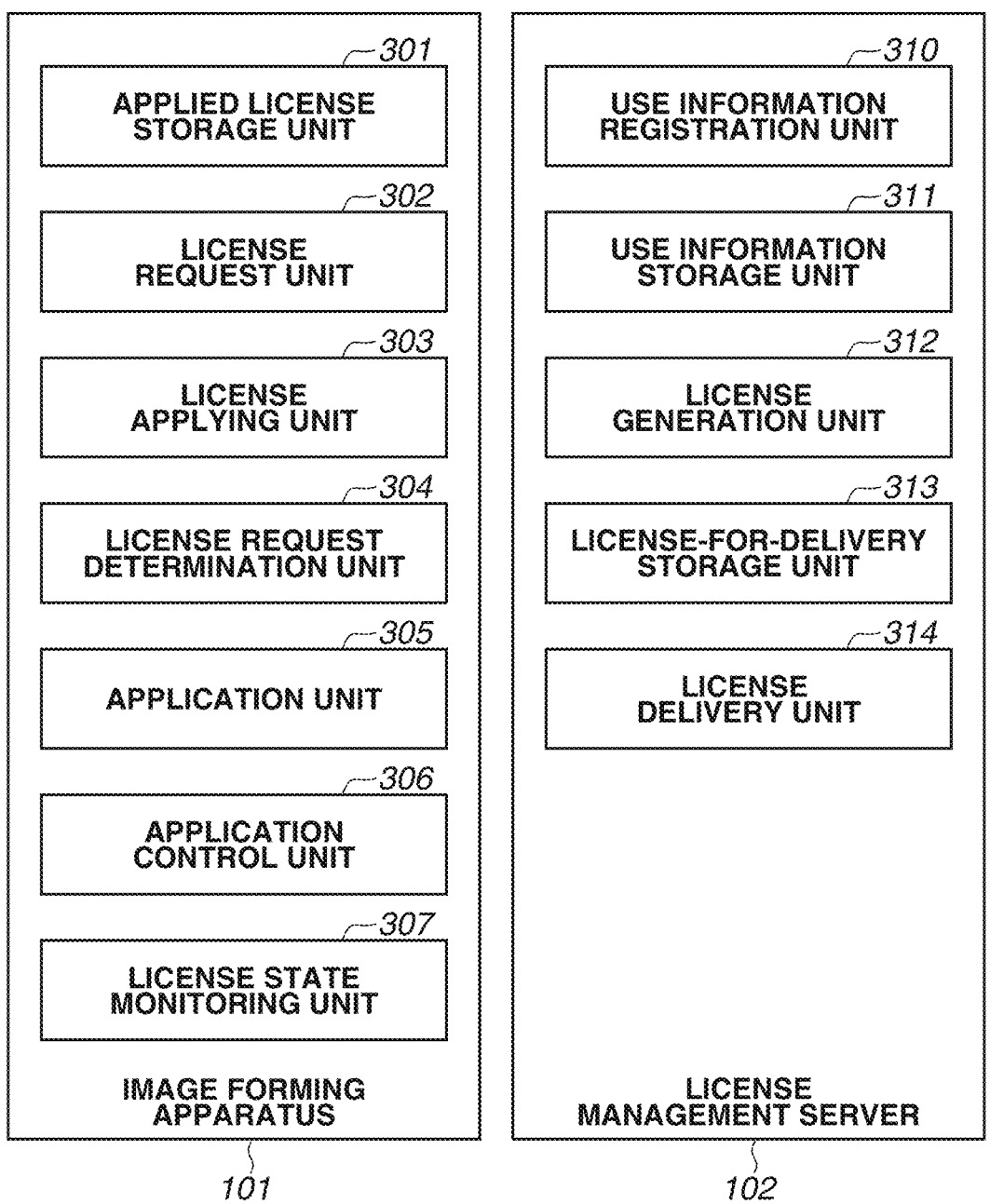
FIG. 3 illustrates a software configuration of the license system.

FIG. 3 is a software configuration diagram of the image forming apparatus 101 and the license management server 102, which constitute the license system. Software units included in the image forming apparatus 101 are stored in the non-volatile memory 202 or the auxiliary storage device 204 in the image forming apparatus 101, and are executed by the CPU 201 to exert the respective functions. Moreover, various pieces of information to be used during execution are retained in the volatile memory 203 or the auxiliary storage device 204 in the image forming apparatus 101, so that the various pieces of information are exchanged between the software units. Similarly, software units included in the license management server 102 are retained in a non-volatile memory or an auxiliary storage device (each not illustrated) included in the license management server 102, and are executed by a CPU, which is similar to the CPU 201, to exert the respective functions. Moreover, various pieces of information to be used during execution are retained in a volatile memory or an auxiliary storage device (each not illustrated) included in the license management server 102, so that the various pieces of information are exchanged between the software units.

The software units included in the image forming apparatus 101 are described as follows. An applied license storage unit 301 has the function to store, in the auxiliary storage device 204, a license that has been applied to an application running on the image forming apparatus 101. An applied license information table shown in Table 1 is a table indicating information about applied licenses stored in the applied license storage unit 301.

TABLE 1

Applied License Information Table

| appl. ID | license type | use start date | use end date | renewal confirmation date | status |
|---|---|---|---|---|---|
| 1 | automatic renewal | 2014/12/20 | 2015/1/30 | 2015/1/20 | continue |
| 2 | automatic renewal | 2014/12/20 | 2015/1/30 | 2015/1/20 | continue |
| 3 | automatic renewal | 2014/12/20 | 2015/1/30 | 2015/1/20 | continue |
| 4 | automatic renewal | 2014/12/25 | 2015/1/30 | 2015/1/25 | continue |
| 5 | automatic renewal | 2014/12/25 | 2015/1/30 | 2015/1/20 | continue |
| 6 | fixed | — | — | — | — |
| 7 | automatic renewal | 2014/11/20 | 2014/12/31 | 2014/12/20 | end | appl.: application
ID: identifier

The application identifier is an identifier for uniquely identifying an application that runs on the image forming apparatus 101. In this example, the application identifier is denoted by a simple integer, but can be denoted by a more complicated character string or a universally unique identifier (UUID). The license type is information indicating the type of an applied license. In the case of Table 1, two types "automatic renewal" and "fixed" are shown. The license type "automatic renewal" is a license of the type in which a license for the application is automatically renewed by an intercommunication between the image forming apparatus 101 and the license management server 102. The "automatic renewal" license is a license for an application classified as a product to which what is termed a subscription model is applied, and is characterized in that the license is automatically renewed without any instruction from the user. The license type "fixed" is a license which is not targeted for automatic renewal, and is characterized in that, when a product has been once purchased, an application classified as the product is continuously usable without the need to renew the license for the application. After being installed in the image forming apparatus 101, the "fixed" license is not automatically renewed unless an instruction is received from the user. Furthermore, since even the "fixed" license can be a license having a validity period, also in order to prevent automatic renewal processing from being performed on the "fixed" license, to set the license type is significant processing in the first exemplary embodiment.

The use start date indicates the calendar day on which an application that runs on the image forming apparatus 101 becomes available. The use end date indicates the calendar day on which an application that runs on the image forming apparatus 101 becomes unavailable, and is set as a use end date described in the license. The renewal confirmation date indicates the calendar day on which the applied license is automatically renewed, i.e., the date on which processing for renewing the license to a new license starts, details of which are described below.

The status is information indicating whether to continue automatic renewal of a license in a case where the license is the license type "automatic license". The term "continue" is information indicating that the image forming apparatus 101 and the license management server 102 communicate with each other to continue automatic renewal of a license for the application. The term "end" is information indicating that it is not necessary to perform automatic renewal of a license for the application, so that the image forming apparatus 101 and the license management server 102 do not automatically communicate with each other to renew the license. How information in the applied license information table is registered is described in the description of a license applying unit 303, which is described below. The applied license information table is referred to by an application, which is described below, so that the behavior of the application is determined. Details thereof are described below.

A license request unit 302 has the function to request a license for an application that runs on the image forming apparatus 101 from the license management server 102. A request for the license is made to the license management server 102 via the LAN 110 and the Internet 111 mentioned above. The request can be made with intervention of another management server capable of communicating via the LAN 110. When making the request, the license request unit 302 transmits the application identifier of an application for which the license is required and the device identifier of the image forming apparatus 101. A license that is delivered from the license management server 102 can be in the form of a file or can be binary data.

FIG. 4 illustrates an example of a license. The license 401 is a license in the form of a file, which contains information for specifying the authority to use an application that is certified by the license 401. The application identifier, license type, use start date, use end date, and renewal confirmation date are the same as those described in Table 1. Table 1 is defined by the information included in the license 401. The device identifier is an identifier for uniquely identifying the image forming apparatus 101 in which the license 401 is used. The electronic signature is a certificate for verifying the validity of the license 401. Furthermore, the license does not need to be the license 401 in the form of a file, and, in the first exemplary embodiment, all types of information for validating an application which are expressed by electronic data are referred to as a "license".

The license applying unit 303 has the function to apply a license acquired by the license request unit 302 to the image forming apparatus 101. When the license is applied to the image forming apparatus 101, the applied license information table, which is stored by the applied license storage unit 301, is updated. The license applying unit 303 checks whether the device identifier included in the license coincides with that of the image forming apparatus 101 and then overwrites and saves the license type, use start date, use end date, and renewal confirmation date with respect to a record corresponding to the same application identifier. The status is not information contained in the license, but is information which the license request unit 302 receives as a result code in response to the license request. The license applying unit 303 receives and registers the information in the applied license information table. The result code is information which is received together with a license, and, when the license for the application is applied, the status is updated based on the result code. If there is no record with the same application identifier, a new record is added. When the license is applied, the license is applied to the image forming apparatus 101, so that the application becomes able to be used. The application is a part constituting a product, and the application becoming able to be used in the image forming apparatus 101 means that the product has been provided to the user.

A license request determination unit 304 has the function to determine whether there is a need to request a license from the license management server 102. The license request determination unit 304 determines to request a license in a case where the license type is "automatic renewal", the current date is between the renewal confirmation date and the use end date, and the status is "continue". The license request determination unit 304 enables controlling the timing and the number of times for requesting a license from the license management server 102. Moreover, in response to the request, information including a license generated by a license generation unit 312 is transmitted from the license management server 102 to the image forming apparatus 101. Details of processing performed by the license request determination unit 304 are described below with reference to FIGS. 8A, 8B, 8C, and 8D.

An application unit 305 includes applications that run on the image forming apparatus 101, and provides extended functions and/or standard functions. The operation of an application is controlled with a license, and, the application runs only in a case where there is a valid license in the applied license information table stored by the applied license storage unit 301. The method for determining whether there is a valid license includes searching for a record corresponding to the application identifier of the application itself and determining whether the current date is between the use start date and the use end date. In a case where neither the use start date nor the use end date are specified, it is determined that there is a valid license. The case where neither the use start date nor the use end date are specified means that the application is not an application classified as a product for subscription. In a case where there is no record corresponding to the application identifier of the application itself, it is determined that there is no valid license.

An application control unit 306 is a unit that manages the life cycle of an application that runs on the image forming apparatus 101. With respect to an application that runs on the image forming apparatus 101, the application control unit 306 manages information about the application, such as the version and a product name, and the state of the application, such as the operation in progress and the operation in pause. Moreover, the application control unit 306 provides a management screen for an application, which the system administrator uses, and the system administrator is able to start or stop the application, uninstall the application, and apply a license via the management screen. The management screen for an application is described in detail below with reference to FIG. 10. Furthermore, the application control unit 306 provides an application programming interface (API) for returning, as a list, both the information and state about applications that run on the image forming apparatus 101 and the license information acquired from the applied license information table stored by the applied license storage unit 301. Additionally, the application control unit 306 provides an API for operations, such as start and stop, of an application that runs on the image forming apparatus 101 and for supplying a license to the applied license storage unit 301.

The operation of an application is controlled with a license, and, the application control unit 306 causes the application to run only in a case where there is a valid license in the applied license information table stored by the applied license storage unit 301. The method for determining whether there is a valid license includes searching for a record corresponding to the application identifier of the application itself and determining whether the current date is between the use start date and the use end date. In a case where neither the use start date nor the use end date are specified, the application control unit 306 determines that there is a valid license. The case where neither the use start date nor the use end date are specified means that the application is not an application classified as a product for subscription. In a case where there is no record corresponding to the application identifier of the application itself, the application control unit 306 determines that there is no valid license.

In the example shown in Table 1, in a case where the current date is Jan. 1, 2015, it is determined that there are valid licenses with respect to the application identifiers 1 to 6, and the corresponding extended functions are provided. Hereinafter, bringing an application into such a provided state is referred to as "start of an application". With respect to the application identifier 7, since the current date has already passed the use end date, it is determined that there is no valid license, and the corresponding extended function is unavailable. Hereinafter, bringing an application into such an unavailable state is referred to as "stop of an application". While, in the first exemplary embodiment, the application control unit 306 is configured to determine the validity of a license, for example, the application itself can determine the validity of a license. In this case, an extended function that is provided by the application is validated or invalidated by the application.

A license state monitoring unit 307 is a unit that monitors the state of a license for an application that runs on the image forming apparatus 101. Using an event notification function of the application control unit 306, the license state monitoring unit 307 receives a notification of events concerning a change in state, such as the start or stop of an application, and a change in state, such as the application of a license or the expiration of a license. When receiving a notification of those events, in a case where there is an application for which the license has already expired, the license state monitoring unit 307 informs the user of such a state. The function of informing the user of such a state is described in detail below with reference to FIG. 5. Moreover, with respect to an application for which the license has already expired, the license state monitoring unit 307 provides a screen for receiving an instruction for renewing the license and an instruction for starting the application. This screen is described in detail below with reference to FIG. 6 to FIG. 9.

Next, software units included in the license management server 102 are described. A use information registration unit 310 has the function to register use information about an application via the information terminal 103. More specifically, the user accesses the license management server 102 via the Internet 111 using a web browser included in the information terminal 103 and registers the use information via a use information registration screen which is provided by the use information registration unit 310.

The use information is information for determining a range or a condition in which an application is able to be used. The application identifier, device identifier, use start date, and use end state are used to set values of the same types as those of the information described in Table 1. Furthermore, the use end date in Table 2 is the last date on which the application is able to be used, while the use end date in Table 1 is a value set in the license and is the last date on which the application is able to be used with the current license. It is to be noted that the use end date differs between two tables, Table 1 and Table 2. The cutoff date is a time limit in each month by which the use information is able to be changed, and, if the use information is changed by the cutoff date, the changed content is reflected in a license available in the next and subsequent months. In the example shown in Table 2, since the cutoff date is set to the 20th day, it is assumed that a license for the next month is generated based on the use information registered by the 19th day. It is assumed that the entity which registers the use information is an application vendor which has sold an application to a client. Furthermore, while, in the first exemplary embodiment, an example in which the use information is manually registered via a web browser has been described, a configuration in which use information that is managed by another system is transmitted by intersystem coordination can be employed.

A use information storage unit 311 has the function to store the use information registered by the use information registration unit 310. A use information table shown in Table 2 is a table indicating an example of the use information stored in the use information storage unit 311.

TABLE 2

Use Information Table

| device ID | appl. ID | use start date | use end date | cutoff date | license generation scheduled date | use end date of generated license |
|---|---|---|---|---|---|---|
| 1 | 1 | 2014/4/1 | 2015/3/31 | 20th day | 2015/1/20 | 2015/1/31 |
| 1 | 2 | 2014/4/1 | 2015/1/31 | 20th day | 2015/1/20 | 2015/1/31 |
| 1 | 3 | 2014/4/1 | 2015/2/10 | 20th day | 2015/1/20 | 2015/1/31 |
| 1 | 4 | 2014/4/1 | indef. period | 25th day | 2015/1/25 | 2015/1/31 |
| 2 | 1 | 2013/4/1 | indef. period | 20th day | 2015/1/20 | 2015/1/31 |

ID: identifier
appl.: application
indef.: indefinite

The license generation scheduled date is the date on which a license is generated in advance in preparation for the next license renewal and which is determined based on the cutoff date. Although details are described below, the license is generated before the renewal confirmation date set in the license based on the cutoff date. While, in the example shown in Table 2, the cutoff date is directly set to the license generation scheduled date, for example, depending on the situation of the license management server 102, the day following the cutoff date or later or the day before the cutoff date can be set to the license generation scheduled date. The reason for the day following the cutoff date or later being set can include, for example, intending to temporarily stop automatic issuance of a license because billing of an application to the user has not been performed.

Here, another form of the use information is described. The use information table shown in Table 2 used for managing the use information can be configured in a form in which the item of the license generation scheduled date is not set and the generation scheduled date for an application is determined only by the cutoff date. Furthermore, the timing for performing automatic generation of a license does not necessarily need to be determined only by the cutoff date. While employing the cutoff date enables generating licenses at regular intervals, the timing can be set in various manners as long as licenses are able to be generated a plurality of times at optional timing not later than the use end date. For example, the number of days elapsed can be set instead of the cutoff date shown in Table 2, and, in that case, a license is not renewed on the determined day of each month but a license is renewed based on the number of days elapsed specified by the user. Therefore, in the present exemplary embodiment, information for determining the timing at which the license generation unit 312 generates licenses several times not later than the use end date and a license delivery unit 314 delivers the generated license to the image forming apparatus 101 for license renewal is defined as period information.

Furthermore, in a case where, for example, the user who registered the use information transmits, to the license management server 102, an instruction to temporarily stop the use of an application, for example, for the reason that billing for the application registered for use has not been performed, the license generation unit 312 does not generate a license. To attain this, in the present exemplary embodiment, in response to reception of the instruction to stop the use, the use information storage unit 311 is configured not to enter a date to the license generation scheduled date. Naturally, this configuration is limiting, but, for example, an item used to determine whether to generate a license can be added to the use information table. In a case where the license management server 102 has received an instruction to stop generating a license, even when the current date has not reached the use end date, the license is prevented from being generated. The use end date of the generated license is the use end date of a license generated by the license generation unit 312, which is described below, and is the use end date of the latest generated license. The use end date of the generated license is used to determine whether to issue licenses for the next and subsequent times. Details thereof are described below with reference to FIG. 7.

The license generation unit 312 has the function to generate a license that is to be delivered to the image forming apparatus 101, based on the information stored in the use information storage unit 311. An example of the generated license is as described with reference to FIG. 4. How each piece of information about the license is set is described as follows. The application identifier and the device identifier are set by using information set forth in the use information table. The license type is set to automatic renewal, and this is because only applications of products that are managed with the license type of automatic renewal are registered in the use information table. In another embodiment, use information that is not the license type of automatic renewal can also be stored in the use information table, and information about the license type can also be additionally managed.

The date on which the license was generated is registered as the use start date of the license 401. Usually, the license that has already been applied to the image forming apparatus 101 is valid until the use end date of the generated license. Therefore, when a license is generated, the use end date of the generated license can be set as the use start date. However, in a state in which the license is not applied due to, for example, a maintenance work for the image forming apparatus 101, a case where a new license is requested can be considered. In this case, if the use end date of the generated license is set as the use start date, an application may become unable to be used during a period from the date on which the license was applied to the use start date. Therefore, a configuration in which the date on which the license was generated is set as the use start date is preferable. As a result, the validity period of a license which the license generation unit 312 generates is set as an overlapping validity period from the license generation scheduled date to the use end date of the generated license.

When the use end date of the license 401 does not exceed the use end date in the use information table, the end of the next month is set, and, when the use end date of the license 401 exceeds the use end date in the use information table, the use end date in the use information table is set. The reason why the end of the next month is set as the use end date is that there is an intention to periodically apply a short-term license to the image forming apparatus 101 with respect to the validity period of a long-term application retained by the license management server 102. This is because the use information is sometimes changed under an agreement between an application vendor and an application user. If a long-term license is in the state of being applied to the image forming apparatus 101 when the use information is changed to change the use end date, the application may be at risk of being used for fraud, thus harming the interest of the application vendor. Therefore, as in the present exemplary embodiment, with respect to use information related to long terms, a short-term license is usually applied to the image forming apparatus 101.

The cutoff date of the next month is set as the renewal confirmation date if it does not exceed the use end date. If the cutoff date of the next month exceeds the use end date, since the renewal confirmation is not performed, a null value is set. Furthermore, in the case of using period information other than the cutoff date, such as the number of days elapsed, a value obtained by taking the number of days elapsed into consideration in addition to the day on which the license was generated would be set as the renewal confirmation date. In any case, the renewal confirmation date contained in the license is determined based on period information registered as the use information. The electronic signature is generated by using an optional value.

While the above description so far has been performed on the premise of a situation in which there is an intention to automatically renew a license on a month-by-month basis, this configuration does not need to be employed, as mentioned above. In the above description of the license information table, an example has been described in which the cutoff date and/or the license generation scheduled date and the renewal confirmation date are determined based on the number of days elapsed. Besides, for example, in a case where there is an intention to automatically renew a license in units of three months, the automatic renewal can be implemented by setting the end of the month after three months as the use end date and setting the cutoff date after three months as the renewal confirmation date. Even in the case of units of one year, the automatic renewal can be implemented in a similar way. In a case where there is an intention to optionally change the above units of renewal, such a change can be implemented by a method in which, for example, the unit for automatically renewing a license is allowed to be entered via the use information registration screen and is then stored in the use information table. A condition for generating a license is described below with reference to FIG. 7.

A license-for-delivery storage unit 313 has the function to store a license generated by the license generation unit 312. Furthermore, the generation of a license is performed before the next renewal date of the license, and the license is generated at the timing before the timing at which the license is requested by the image forming apparatus 101, as one of characteristics of the present exemplary embodiment except for the case of stopping the use. A license-for-delivery information table shown in Table 3 is a table indicating an example of license-for-delivery information stored in the license-for-delivery storage unit 313.

TABLE 3

License-For-Delivery Information Table

| device ID | appl. ID | license | status |
|---|---|---|---|
| 1 | 1 | licensefile_1_1_20141220.lic | continue |
| 1 | 2 | licensefile_1_2_20141220.lic | continue |
| 1 | 3 | licensefile_1_3_20141220.lic | continue |
| 1 | 4 | licensefile_1_4_20141225.lic | continue |
| 2 | 1 | licensefile_2_1_20141220.lic | continue |

ID: identifier
appl.: application

The license refers to the license 401, and is a license that is installed to allow an application specified by the device identifier and the application identifier to run on the image forming apparatus 101. The entity of the license is stored at a predetermined location on the structure of cloud computing on which the license management server 102 operates or on a file system belonging to the license management server 102.

The status retains information indicating whether to end the renewal of a license because the use end date of an application is reached on the use end date included in the currently generated license. If the status is "continue", the renewal of a license can be performed. If the status is "end", apparently, it has been determined that no renewal of a license is performed. Furthermore, although not set forth in Table 3, there is also a state in which a license is not registered. Such a state occurs when the above-mentioned instruction for stopping a license has been received. In that state, since a license is not generated, the item "license" of the target record in Table 3 is set blank, but, on the assumption that an instruction for releasing the stop of the license is issued and the license is generated again, it is assumed that the item "status" is set to "continue". Naturally, the item "status" can be set to "end". Associating the license and the status with each other enables the license management server 102 to concurrently perform both validation of an application in the image forming apparatus 101 and stoppage of processing for the license request. Information in the license-for-delivery information table is updated when a license is generated by the license generation unit 312. Details thereof are described below with reference to FIG. 7.

The license delivery unit 314 has the function to deliver an appropriate license stored in the license-for-delivery information table in response to the license renewal request from the image forming apparatus 101. The license delivery unit 314 receives, from the license request unit 302, a renewal request including the device identifier and the application identifier. The license delivery unit 314 refers to the license-for-delivery information table stored by the license-for-delivery storage unit 313, and searches for a record having the device identifier and the application identifier included in the renewal request. If the record having the device identifier and the application identifier included in the renewal request is found, the license delivery unit 314 acquires a license name and then acquires a license stored in a predetermined location. If the record having the device identifier and the application identifier included in the renewal request is not found, the license delivery unit 314 refers to the use information table stored by the use information storage unit 311. With respect to the use information table, the license delivery unit 314 also searches for a record having the device identifier and the application identifier included in the renewal request, and returns a result of the search to the image forming apparatus 101 serving as a license requestor.

Figure 14:
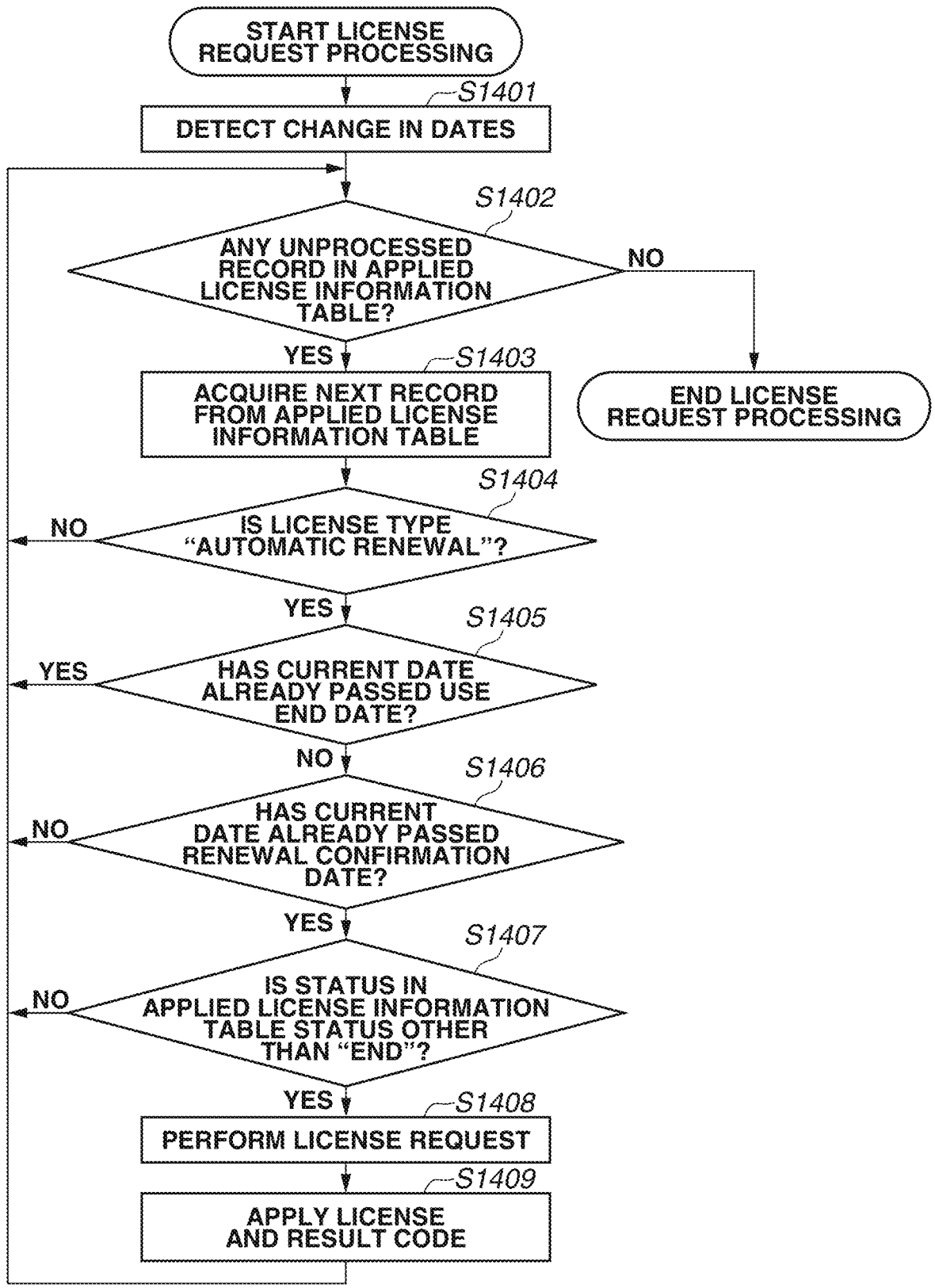
FIG. 14 is a flowchart illustrating license request processing.

FIG. 14 is a flowchart illustrating the flow of license request processing performed by the image forming apparatus 101. In step S1401, the license request unit 302 detects a change in dates. As mentioned above, the frequency of license renewal varies with a setting period. Therefore, in a case where the frequency of renewal is high, the date and time or the hour and minute is taken into consideration, and, in a case where the frequency of renewal is low, the month is taken into consideration. Furthermore, in the case of a license system in which a license is issued based on the number of days elapsed, the image forming apparatus 101 also needs to perform a renewal request based on the number of days elapsed. In other words, step S1401 is performed to detect whether the current timing is timing at which the renewal confirmation of a license is needed.

In step S1402, the license request unit 302 determines whether processing in step S1403 and subsequent steps has been completed with respect to all of the records in the applied license information table. If the processing has been completed with respect to all of the records (NO in step S1402), the processing in the present flowchart ends. If there is an unprocessed record (YES in step S1402), the processing proceeds to step S1403. Furthermore, a record the status of which is "end" described below is deemed as a processed record, and is not subjected to processing in step S1403 and subsequent steps. As a result, the license request unit 302 does not any more request a license for the corresponding application from the license management server 102.

In step S1403, the license request unit 302 selects one of unprocessed records in the applied license information table. In step S1404, the license request unit 302 determines whether the license type of the record selected in step S1403 is "automatic renewal". If the license type is "automatic renewal" (YES in step S1404), the processing proceeds to step S1405. If the license type is not "automatic renewal" (NO in step S1404), the processing returns to step S1402. In the case of the example shown in Table 1, with regard to the sixth record, since the license type is "fixed", as a result of determination in step S1404, the processing returns to step S1402. With regard to the other records, the processing proceeds to step S1405. Furthermore, an exemplary embodiment in which the determination in step S1404 is not performed can be employed, so that, in addition to an embodiment in which a license of the "fixed" license type is not taken into consideration, for example, an embodiment in which licenses are managed with another license type table can be employed.

In step S1405, the license request unit 302 determines whether the current date has already passed the use end date.

The current date having already passed the use end date means that the target application is already in the state of being unavailable, and, if so, the license request unit 302 determines that the automatic renewal is not required. Since a license request to the license management server 102 may be continued in such an exceptional case that the use end date is passed while the use information is not registered with the license management server 102, an example in which the determination in this step is performed is described in the present exemplary embodiment. However, an exemplary embodiment in which the determination in step S1405 is not performed can be employed. If the current date has already passed the use end date (YES in step S1405), the processing returns to step S1402. If the current date has not yet passed the use end date (NO in step S1405), the processing proceeds to step S1406.

In step S1406, the license request unit 302 determines whether the current date has already passed the renewal confirmation date. When the current date has already passed the renewal confirmation date set in the license 401, since a new license has been generated by the license management server 102, the license request unit 302 needs to perform a license request. If the current date has already passed the renewal confirmation date (YES in step S1406), the processing proceeds to step S1407. If the current date has not yet passed the renewal confirmation date (NO in step S1406), the processing returns to step S1402.

In step S1407, the license request unit 302 determines whether the status in the applied license information table is a status other than "end". When the status is "end", for example, a license continuing until the use end date stored by the license management server 102 has already been applied, so that the license request unit 302 determines that it is not necessary to request a license. If the status is a status other than "end", more specifically, any one of "continue" and "use information unregistered" (YES in step S1407), the processing proceeds to step S1408. If the status is "end" (NO in step S1407), the processing returns to step S1402.

More specifically, step S1401 is periodically performed, and polling is performed from the image forming apparatus 101 to the license management server 102 by a license request performed in step S1408 and subsequent steps. However, since determination steps in steps S1404 to S1407 enable performing a license request only when there is an application the license for which needs to be renewed, an unnecessary license request can be prevented from being performed.

In step S1408, the license request unit 302 performs a license request. Details of the license request have already been described in the description of the license request unit 302, and are, therefore, not repeated here. In step S1409, the license applying unit 303 applies the license and the result code acquired in step S1408. In a case where a license has not yet been issued, i.e., in a case where "use information unregistered" has been received as the result code, the license applying unit 303 does not apply the license, and stores the record of the corresponding application as "use information unregistered". Furthermore, as the license is not applied, since the renewal confirmation date in the license information table is not updated, the license request unit 302 performs a license request in step S1408 again to the license management server 102. In other words, the license request unit 302 performs polling processing for repeatedly requesting a license until the use end date. Furthermore, in a case where a license has not been able to be acquired even after the use end date, the license request unit 302 is caused by step S1405 not to perform a license request. In other words, the license request unit 302 is caused to stop polling processing.

An applied license information table obtained as a result when "2015/1/20" has been reached while the applied license information table shown in Table 1 is retained and a license request has been performed to the license management server 102 storing the license-for-delivery information table shown in Table 3 is shown in Table 4.

TABLE 4

Applied License Information Table After Renewal Confirmation

| appl. ID | license type | use start date | use end date | renewal confirmation date | status |
|---|---|---|---|---|---|
| 1 | automatic renewal | 2015/1/20 | 2015/2/28 | 2015/2/20 | continue |
| 2 | automatic renewal | 2014/12/20 | 2015/1/30 | 2015/1/20 | end |
| 3 | automatic renewal | 2015/1/20 | 2015/2/10 | 2015/1/20 | end |
| 4 | automatic renewal | 2014/12/25 | 2015/1/30 | 2015/1/25 | continue |
| 5 | automatic renewal | 2014/12/25 | 2015/1/30 | 2015/1/20 | continue |
| 6 | fixed | — | — | — | — |
| 7 | automatic renewal | 2014/11/20 | 2014/12/31 | 2014/12/20 | end | appl.: application
ID: identifier

As shown in the applied license information table of Table 4, with respect to a record in which a license is generated, the use start date, the use end date, and the renewal confirmation date are updated. Moreover, with respect to a record in which the status is changed, information indicating the change of the status is transmitted as the result code to the image forming apparatus 101, so that the status in the applied license information table is updated.

According to the procedure illustrated in the flowchart of FIG. 14, when the current date has passed the renewal confirmation date, the license request unit 302 requests a license from the license management server 102, and, if there is a valid license, the license is applied by the license applying unit 303. However, in a case where a valid license is not generated for a reason such as nonpayment of charges or failure of a license generation batch of the license management server 102, polling is repeatedly performed until the use end date specified in the current license. Then, in a case where a license is not generated until the use end date, polling is ended, so that the application is stopped as described with respect to the application control unit 306.

Figure 5:
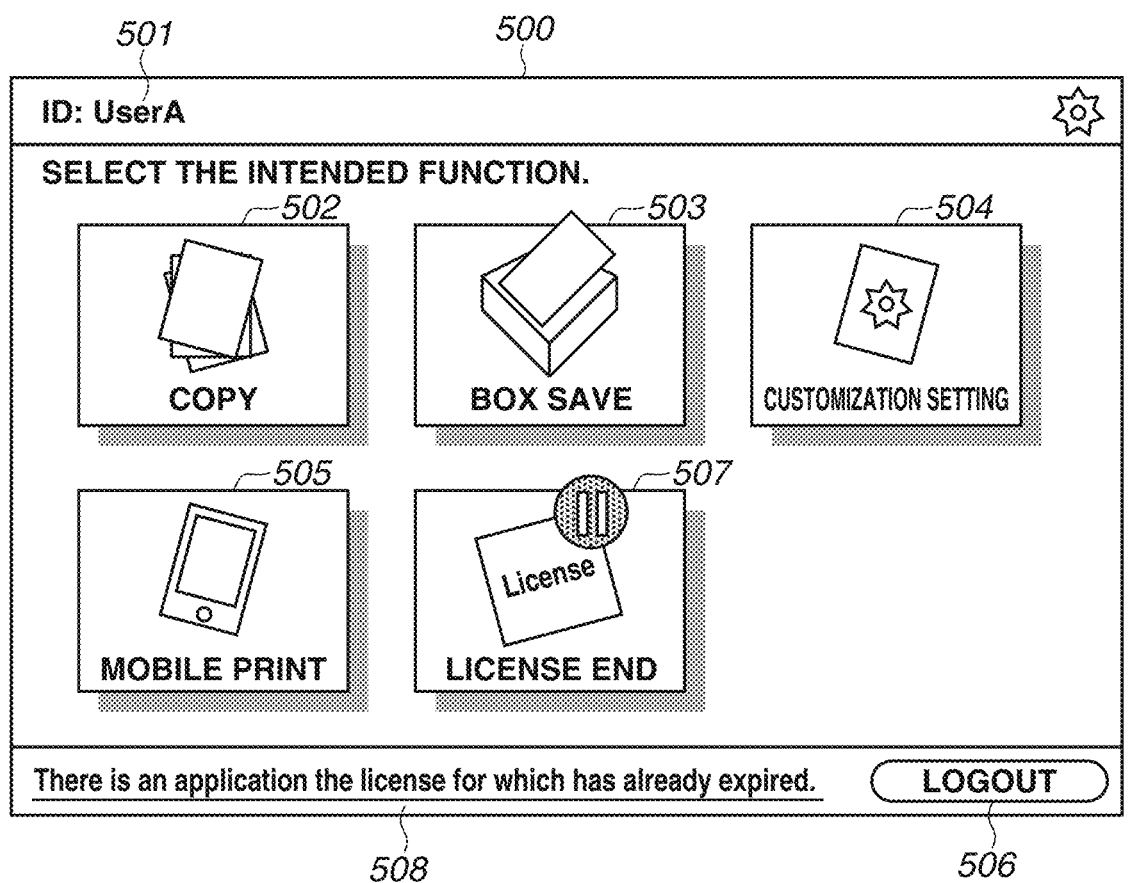
FIG. 5 illustrates a selection screen for applications.

FIG. 5 illustrates an example of an application selection screen 500, which is displayed on the display 205 of the image forming apparatus 101. The application selection screen 500 is a screen that is displayed by a screen display control unit (not illustrated), and the screen display control unit is implemented by being executed by the CPU 201 as with the various units illustrated in FIG. 3. An ID 501 indicates an identification code of the authenticated user who is logged in to the image forming apparatus 101. Icons 502 to 505 are icons of applications that are available in the image forming apparatus 101. Each icon is displayed based on information about an application targeted for display of the icon, which is stored in the volatile memory 203. To set an application as a target for icon display, processing for registering an icon corresponding to the application on the application selection screen 500 is required.

When the icon 502 illustrated in FIG. 5 is selected, a screen (not illustrated) for an application for executing copy stored in the volatile memory 203 is displayed. A logout button 506 is a button used to cause the authenticated user who is logged in to the image forming apparatus 101 to log out. When logout is performed, the application selection screen 500 is hidden, and an authentication screen (not illustrated) is displayed. An icon 507 is an icon indicating that there is an application the license for which has expired. When the icon 507 is selected, a screen 600 for displaying a list of applications the license for which has expired, which is stored in the volatile memory 203, is displayed as described with reference to FIG. 6. Furthermore, although details are described below, the icon 507 is displayed only when there is at least one license that has expired among licenses for applications classified as a subscription model. A status bar 508 is a region for displaying a warning or message of, for example, paper jam, out of paper, or out of toner occurring in the image forming apparatus 101, and, in the example illustrated in FIG. 5, is displaying a message indicating that there is an application the license for which has expired. The method for displaying the icon 507 or the method for displaying a message in the status bar 508 is described in detail below with reference to FIG. 7.

Figure 6:
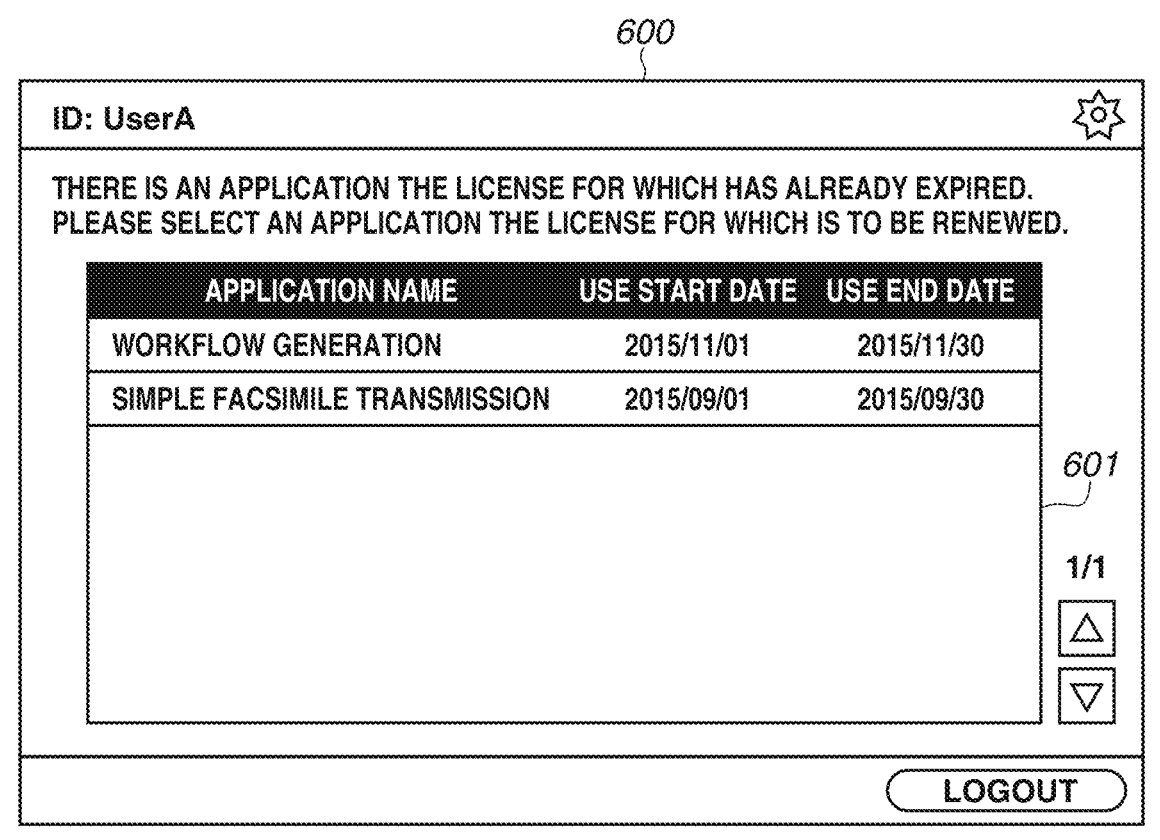

FIG. 6 illustrates a screen for displaying a list of applications the license for which has expired, which is displayed when the icon 507 is selected in the application selection screen 500 displayed on the display 205 of the image forming apparatus 101. A list field 601 is used to display in a list the product name of an application the license for which has expired and the use start date and the use end date of the license. Furthermore, when an application displayed in the list field 601, a screen 800a for confirming execution of license renewal, which is described below with reference to FIGS. 8A to 8D, is displayed. The method for displaying a list of applications in the list field 601 is described in detail with reference to FIG. 7.

Figure 7:
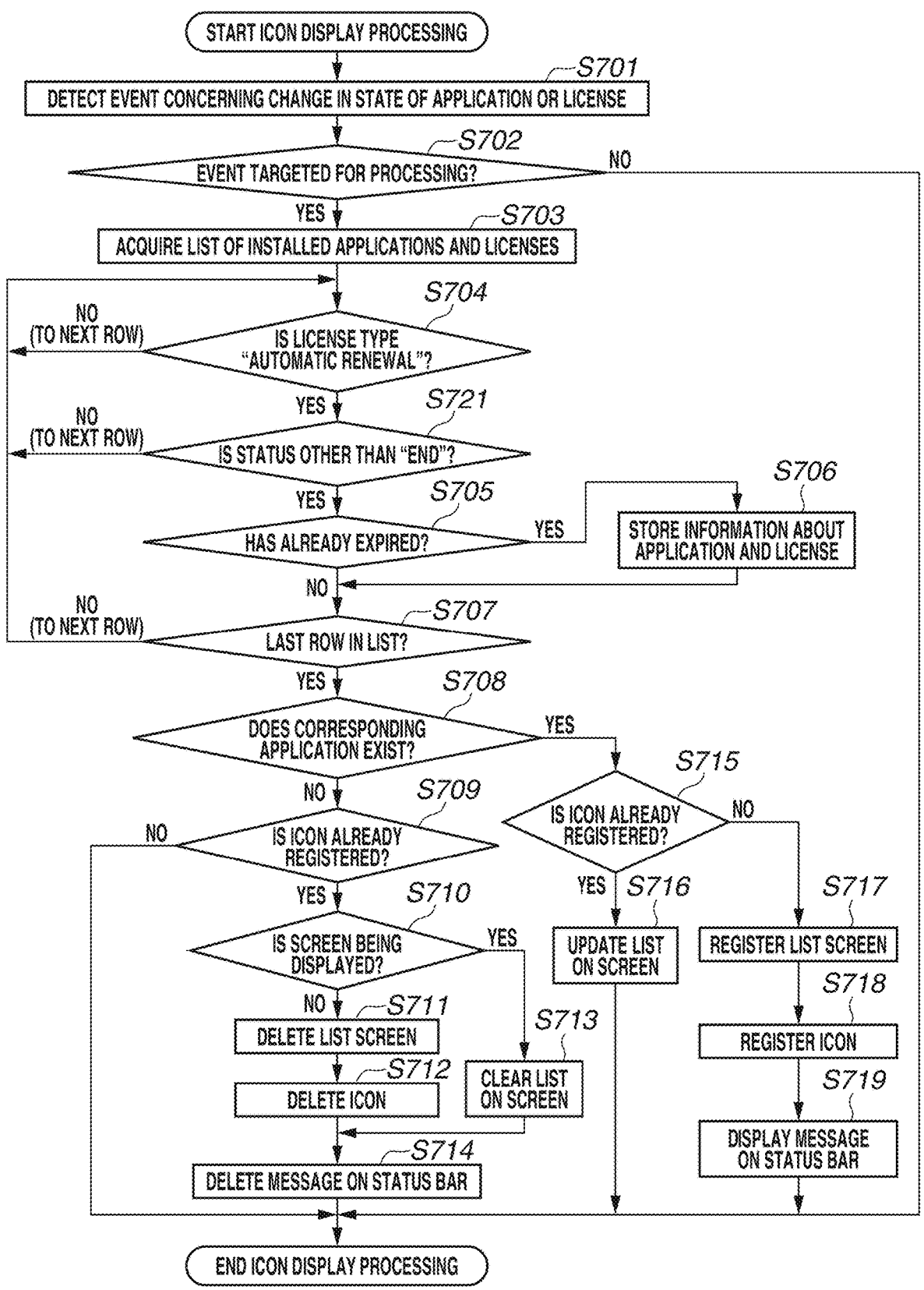
FIG. 7 is a flowchart illustrating a procedure for displaying an icon that indicates the expiration of a license.

FIG. 7 is a flowchart illustrating the flow of processing concerning display of the icon 507 and display of a message on the status bar 508 in the application selection screen 500 and display of a list in the list field 601, which are displayed on the display 205 of the image forming apparatus 101. In step S701, the license state monitoring unit 307 detects an event concerning a change in state, such as start or stop, of an application or a change in state, such as application of a license or expiration of a license, using an event notification function of the application control unit 306.

If, in step S702, the event detected in step S701 corresponds to an event concerning application of a license or expiration of a license (YES in step S702), the processing proceeds to step S703, and if the detected event does not correspond to the above event (NO in step S702), the processing ends. Here, the reason why the processing ends when the detected event does not correspond to the above event is that when a change in state of a license does not occur, the content of a notification already provided to the user remains unchanged. Furthermore, in the case of start-up processing of the image forming apparatus 101, processing in steps S701 and S702 is not performed, and processing in step S703 and subsequent steps is performed. Here, the reason why processing in steps S701 and S702 is not performed is described. In start-up processing of the image forming apparatus 101, irrespective of event notification performed by the application control unit 306, the license state monitoring unit 307 needs to acquire the states of all of the licenses applied to the image forming apparatus 101 and to determine whether it is necessary to notify the user.

In step S703, the license state monitoring unit 307 acquires, as a list, information and states about applications that operate on the image forming apparatus 101 and license information acquired from the applied license information table stored by the applied license storage unit 301, using an API provided by the application control unit 306. Then, the license state monitoring unit 307 starts processing with the first row of the list. If, in step S704, it is determined that the license type is not "automatic renewal" (NO in step S704), the license state monitoring unit 307 shifts the processing target to the next row and the processing returns to step S704, and, if it is determined that the license type is "automatic renewal" (YES in step S704), the processing proceeds to step S721.

In step S721, the license state monitoring unit 307 determines whether the status in the applied license information table is other than "end". If the application at the current row is an application in which "end" has been received as the result code in step S1409 and the status in the applied license information table has been set to "end" (NO in step S721), the processing returns to step S704 so as to check for an application at the next row. If the status of the application at the current row is other than "end" (YES in step S721), the processing proceeds to step S705. Furthermore, in the first exemplary embodiment, since step S721 is performed in advance of step S705, even when a license has expired, the icon 507 is controlled not to be displayed on the application selection screen illustrated in FIG. 5. In another embodiment, after confirmation of expiration of a license, it can be determined whether the status in the applied license information table is "end".

If, in step S705, the license state monitoring unit 307 determines that the license has already expired in view of the applied license information table as stored (YES in step S705), the processing proceeds to step S706, and, if the license has not yet expired (NO in step S705), the processing proceeds to step S707.

While the license request unit 302 requests a license from the license management server 102 when the renewal confirmation date has been reached as described with reference to FIG. 14, in a case where the license has not yet been generated, the license request unit 302 repeatedly performs polling until the use end date specified by the current applied license. Then, in a case where the license is not generated until the use end date, polling is ended, and the application is stopped by the application control unit 306. Such a license for the application is in the state of having already expired as mentioned in step S705.

In step S706, with respect to the application for which a valid license is not present, the license state monitoring unit 307 stores information including the application identifier, the product name, the use start date, and the use end date in the volatile memory 203, and the processing then proceeds to step S707. At this time, in a case where processing in step S706 has already been performed on the preceding row of the list, the above information is stored not in overwrite mode but as additional information. Although details are described below, an application added to the volatile memory 203 is displayed on the screen illustrated in FIG. 6.

In step S707, the license state monitoring unit 307 determines whether the current row is the last row of the list, and, if a target row remains (NO in step S707), the processing returns to step S704 to perform the processing on the next row and, if no target row remains (YES in step S707), the processing proceeds to step S708. In step S708, the license state monitoring unit 307 determines whether the application information stored in step S706 exists in the volatile memory 203, and, if the application information exists (YES in step S708), the processing proceeds to step S715 and, if the application information does not exist (NO in step S708), the processing proceeds to step S709.

In step S709, the license state monitoring unit 307 determines whether the icon 507 is already registered, and, if the icon 507 is already registered (YES in step S709), the processing proceeds to step S710 and, if the icon 507 is not yet registered (NO in step S709), the processing ends. Even when the processing proceeds to any step, if an application which is classified as a subscription model and to which a valid license is not applied does not exist, an icon for activating the screen illustrated in FIG. 6 is not displayed on the application selection screen.

In step S710, the license state monitoring unit 307 determines whether the screen 600 for displaying a list of applications the license for which has already expired is being displayed. Then, if it is determined that the screen 600 is being displayed (YES in step S710), the processing proceeds to step S713 and, if it is determined that the screen 600 is not being displayed (NO in step S710), the processing proceeds to step S711. In step S711, the license state monitoring unit 307 deletes, from the volatile memory 203, the screen 600 for displaying a list of applications the license for which has already expired, and the processing then proceeds to step S712. In step S712, the license state monitoring unit 307 deletes the icon 507 on the application selection screen 500, and the processing then proceeds to step S714.

In step S713, the license state monitoring unit 307 clears the list in the list field 601 on the screen 600 for displaying a list of applications the license for which has already expired, and the processing then proceeds to step S714. Furthermore, the reason why steps S711 and S712 are not performed while the screen 600 is being displayed is to avoid a situation in which an application the license for which has already expired disappears suddenly from the screen 600 when the user is performing an operation. After that, for example, when the screen 600 for displaying a list of applications the license for which has already expired has switched to the application selection screen 500, the license state monitoring unit 307 detects this state and performs steps S711 and S712.

In step S714, the license state monitoring unit 307 deletes a message displayed on the status bar 508 by the license state monitoring unit 307. In step S715, the license state monitoring unit 307 determines whether the icon 507 is already registered, and, if the icon 507 is already registered (YES in step S715), the processing proceeds to step S716 and, if the icon 507 is not yet registered (NO in step S715), the processing proceeds to step S717. Even when the processing proceeds to any step, if an application which is classified as a subscription model and to which a valid license is not applied exists, an icon for activating the screen illustrated in FIG. 6 is displayed on the application selection screen.

In step S716, the license state monitoring unit 307 acquires information about an application for which a valid license is not present, which has been stored in the volatile memory 203 in step S706, and updates display of the list field 601, and the processing then ends. In other words, an application to which a license is not applied and the applied license for which has already expired is added to the list illustrated in FIG. 6 and is thus set as a target to be selected by the user. In step S717, the license state monitoring unit 307 acquires information about an application for which a valid license is not present, which has been stored in the volatile memory 203 in step S706. Moreover, the license state monitoring unit 307 registers, in the volatile memory 203, the acquired information as the screen 600 for displaying a list of applications the license for which has already expired, which is set in the list field 601, and the processing then proceeds to step S718.

In step S718, the license state monitoring unit 307 registers the icon 507 on the application selection screen 500, and the processing then proceeds to step S719.

In step S719, the license state monitoring unit 307 displays, on the status bar 508, a message indicating that there is an application the license for which has already expired, and the processing then ends. In this way, in the first exemplary embodiment, a license that has already expired is controlled by the flow illustrated in FIG. 14 in such a way as not to be automatically renewed. As a result, according to the steps illustrated in FIG. 7, unless an instruction for renewing a license is received from the user, the license request unit 302 does not perform a license request.

FIG. 8A illustrates an example of a screen 800a for confirming execution of license renewal, which is displayed when an application displayed in the list field 601 is selected on the screen 600 for displaying a list of applications the license for which has already expired. A message display field 801 displays the product name of the current installed application and the use start date and the use end date of the license thereof. A button 802 is used to start license renewal. When the button 802 is pressed, a screen 800b indicating that the license is in the process of being renewed, which is described below with reference to FIG. 8B, is displayed, and license update processing, which is described in detail below with reference to FIG. 9, is started. A button 803 is used to stop license renewal. When the button 803 is pressed, the screen 800a for confirming execution of license renewal is hidden, and the screen 600 for displaying a list of applications the license for which has already expired is displayed.

FIG. 8B illustrates an example of the screen 800b indicating that the license is in the process of being renewed, which is displayed when the button 802 is pressed on the screen 800a for confirming execution of license renewal. In a case where the renewal of the license is successful, the screen 800b indicating that the license is in the process of being renewed is hidden, and a screen 800c indicating that the renewal of the license has been normally completed, which is described below with reference to FIG. 8C, is automatically displayed. On the other hand, in a case where the renewal of the license is failed, the screen 800b indicating that the license is in the process of being renewed is hidden, and a screen 800d indicating that the renewal of the license is failed, which is described below with reference to FIG. 8D, is automatically displayed.

FIG. 8C illustrates an example of the screen 800c indicating that the renewal of the license is successful, which is automatically displayed in a case where the renewal of the license is successful, on the screen 800b indicating that the license is in the process of being renewed. A message display field 804 displays the product name of the installed application and the use start date and the use end date of the license after renewal. A button 805 is used to close the screen 800c indicating that the renewal of the license is successful. When the button 805 is pressed, the screen 800c indicating that the renewal of the license is successful is hidden, and the screen 600 for displaying a list of applications the license for which has already expired is displayed.

FIG. 8D illustrates an example of the screen 800d indicating that the renewal of the license is failed, which is automatically displayed in a case where the renewal of the license is failed, on the screen 800b indicating that the license is in the process of being renewed. A message display field 806 displays a message indicating that there is no valid license and prompting the user to contact a person in charge of service. The button 805 is used to close the screen 800d indicating that the renewal of the license has abnormally ended. When the button 805 is pressed, the screen 800d indicating that the renewal of the license is failed is hidden, and the screen 600 for displaying a list of applications the license for which has already expired is displayed.

FIG. 9 is a flowchart illustrating the flow of license update processing in the image forming apparatus 101, which is performed when an instruction for renewing the license is received via the screen 800a. In step S901, the license state monitoring unit 307 causes the license request unit 302 to request a license from the license management server 102, and the processing then proceeds to step S902.

If, in step S902, the license request unit 302 determines that the acquisition of a license in step S901 is successful (YES in step S902), the processing proceeds to step S903, and, if the license request unit 302 determines that the acquisition of a license is failed (NO in step S902), the processing proceeds to step S908. In step S903, the license applying unit 303 applies the license acquired in step S901, and the processing then proceeds to step S904. In step S904, the license applying unit 303 determines whether the application of the license in step S903 is successful, and, if the application of the license is successful (YES in step S904), the processing proceeds to step S905 and, if the application of the license is failed (NO in step S904), the processing proceeds to step S908.

In step S905, the license state monitoring unit 307 performs a request for starting an application using an API for starting an application, which is supplied by the application control unit 306, and the processing then proceeds to step S906.

In step S906, the license state monitoring unit 307 determines whether starting of the application in step S905 is successful, and, if starting is successful (YES in step S906), the processing proceeds to step S907 and, if starting is failed (NO in step S906), the processing proceeds to step S908. In step S907, the license state monitoring unit 307 displays the screen 800c indicating that the renewal of the license is successful, and the processing then ends. In step S908, the license state monitoring unit 307 displays the screen 800d indicating that the renewal of the license is failed, and the processing then ends. The screen 800d is a screen which is displayed when the acquisition of a new license is failed as a result of performing the renewal of the license via the screen illustrated in FIG. 6, and the screen 800d is not displayed when the acquisition of a new license is failed in the automatic renewal of the license described with reference to FIG. 14. The reason is that, in a case where the automatic renewal is failed, after that, since several attempts to acquire a new license for renewal will be made, it is not necessary to display the screen 800d.

As described above, according to the first exemplary embodiment, the user can recognize that there is a product the license for which has already expired. Moreover, in a case where a valid license exists in a license management server, the user can start processing for renewing a license to resume a product having an extended function.

A second exemplary embodiment is directed to an issue that occurs when the license for an application that has been intentionally stopped by the system administrator has expired. In this issue, when the license has expired, in a case where a user who does not have the authority of the system administrator is able to perform processing for renewing the license and to start the application, the application, which has been intentionally stopped by the system administrator, would be able to be started.

Figure 10:
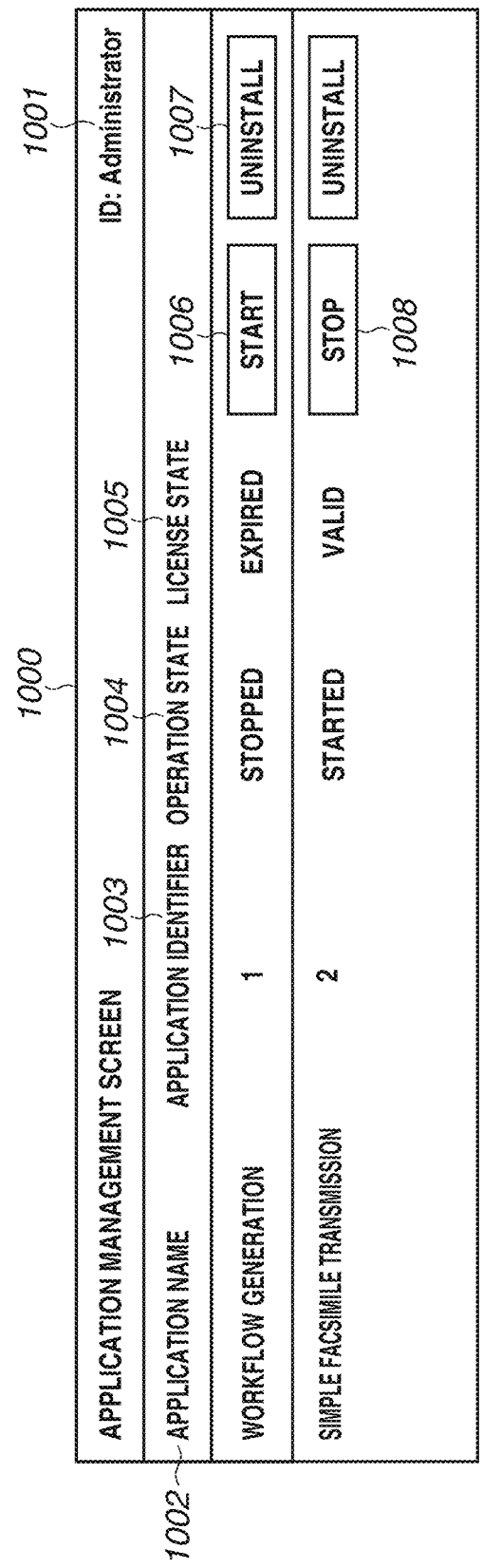
FIG. 10 illustrates an application management screen on which a user having the authority of a system administrator is allowed to perform an operation.

FIG. 10 illustrates an example of an application management screen 1000, which is provided by the application control unit 306. The application management screen 1000 is a screen that is accessible via the Internet 111 by the use of a web browser included in the information terminal 103. The user is able to use the application management screen 1000 only when the user enters, for example, a user ID and a password in an authentication screen (not illustrated) and is determined to have the authority of the system administrator.

An ID 1001 indicates an identification code of the authenticated user who is logged in to the image forming apparatus 101. An application name 1002 indicates the product name of an application that runs on the image forming apparatus 101. An application identifier 1003 indicates an ID for identifying the application. An operation state 1004 indicates the state of the application. This example indicates that the operation state of the application is "stopped" or "started". A license state 1005 indicates the state of a license for the application. This example indicates that the state of a license is "expired" or "valid". A start button 1006 is a button used to issue an instruction for starting the application. When the start button 1006 is pressed, the application is started only in a case where it is determined that there is a valid license. Furthermore, processing performed when the start button 1006 is pressed is described in detail below with reference to FIG. 12. An uninstall button 1007 is a button used to issue an instruction for uninstalling the application. When the uninstall button 1007 is pressed, the application is uninstalled. A stop button 1008 is a button used to intentionally stop the application. When the stop button 1008 is pressed, the application is stopped even in a case where the license has not yet expired. Furthermore, processing performed when the stop button 1008 is pressed is described in detail below with reference to FIG. 11.

Figure 11:
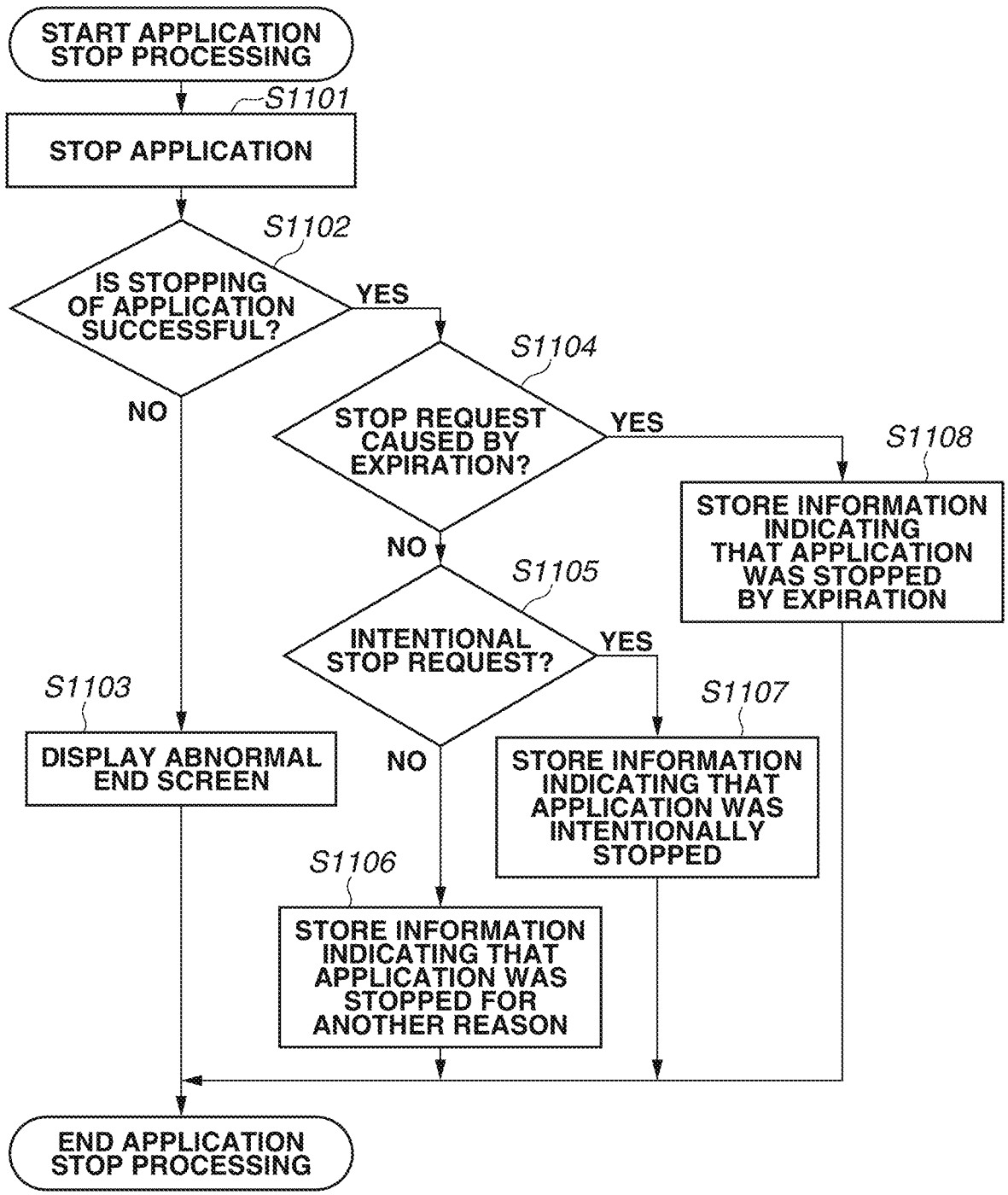
FIG. 11 is a flowchart illustrating processing for stopping an application.

FIG. 11 is a flowchart illustrating the flow of processing for stopping an application, which is performed when the user issues an instruction for stopping a specific application via the application management screen 1000. In step S1101, the application control unit 306 performs stopping processing of the application, and the processing then proceeds to step S1102. In step S1102, the application control unit 306 determines whether stopping processing of the application in step S1101 is successful, and, if the stopping processing is successful (YES in step S1102), the processing proceeds to step S1104 and, if the stopping processing is failed (NO in step S1102), the processing proceeds to step S1103. In step S1103, the application control unit 306 displays an abnormal end screen (not illustrated), and the processing then ends.

In step S1104, the application control unit 306 determines whether the stop request for the application is a stop request caused by the expiration of a license. If the stop request is caused by the expiration of a license (YES in step S1104), the processing proceeds to step S1108 and, if the stop request is not caused by the expiration of a license (NO in step S1104), the processing proceeds to step S1105. Whether the stop request is caused by the expiration of a license is determined according to whether the application control unit 306 has performed the stop processing for the application in a case where there is no valid license in the applied license information table stored by the applied license storage unit 301.

In step S1105, the application control unit 306 determines whether the stop request for the application is an intentional stop request, and, if the stop request for the application is an intentional stop request (YES in step S1105), the processing proceeds to step S1107 and, if the stop request for the application is not an intentional stop request (NO in step S1105), the processing proceeds to step S1106. Whether the stop request for the application is an intentional stop request is determined according to whether the stop button 1008 has been pressed on the application management screen 1000. In step S1106, the application control unit 306 stores, in the auxiliary storage device 204, information indicating that the application targeted for stopping was stopped for another reason, and the processing then ends. Although the detailed description is omitted in the present exemplary embodiment, examples of another reason include a case where there was some sort of trouble in the application and the application control unit 306 stopped the application. Furthermore, the information stored in this manner is hereinafter referred to as a "reason for application stop".

In step S1107, the application control unit 306 stores, in the auxiliary storage device 204, information indicating that the application targeted for stopping was intentionally stopped as the reason for application stop, and the processing then ends. In step S1108, the application control unit 306 stores, in the auxiliary storage device 204, information indicating that the application targeted for stopping was stopped by the expiration of a license as the reason for application stop, and the processing then ends.

Figure 12:
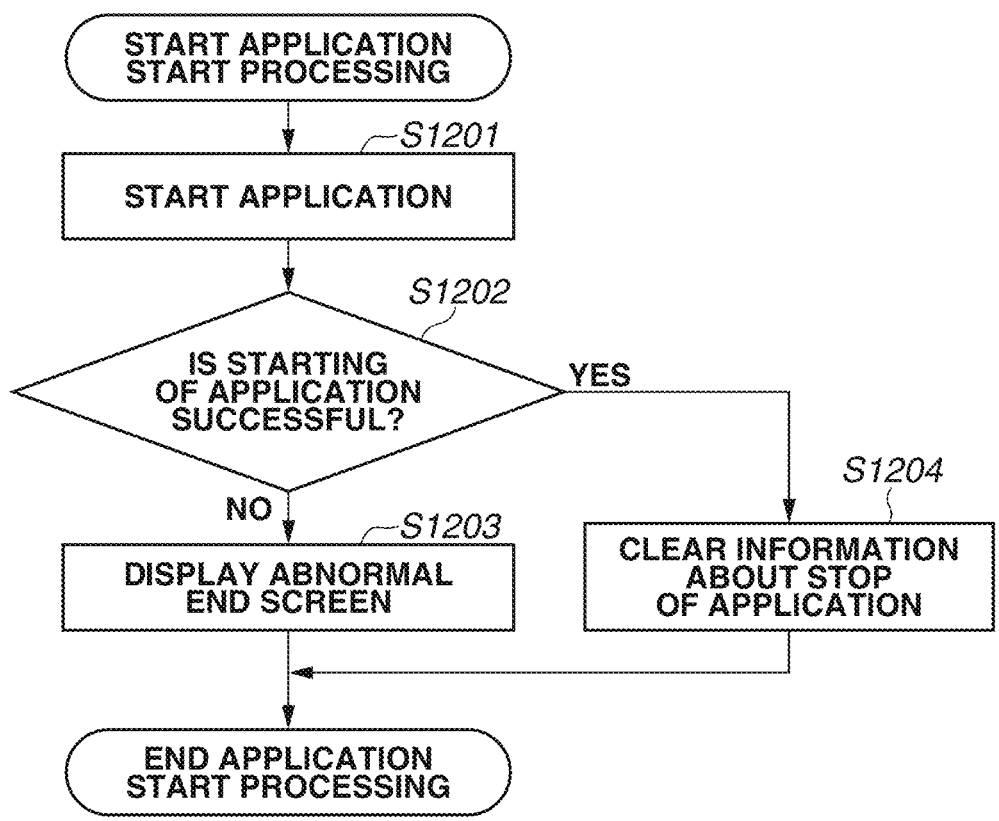
FIG. 12 is a flowchart illustrating processing for starting an application.

FIG. 12 is a flowchart illustrating the flow of processing for starting an application. In step S1201, the application control unit 306 performs starting processing of the application, and the processing then proceeds to step S1202. In step S1202, the application control unit 306 determines whether starting processing of the application in step S1201 is successful, and, if the starting processing is successful (YES in step S1202), the processing proceeds to step S1204 and, if the starting processing is failed (NO in step S1202), the processing proceeds to step S1203. In step S1203, the application control unit 306 displays an abnormal end screen (not illustrated), and the processing then ends. In step S1204, the application control unit 306 clears the reason for application stop stored in the auxiliary storage device 204 with respect to the application targeted for starting, and the processing then ends.

Figure 13:
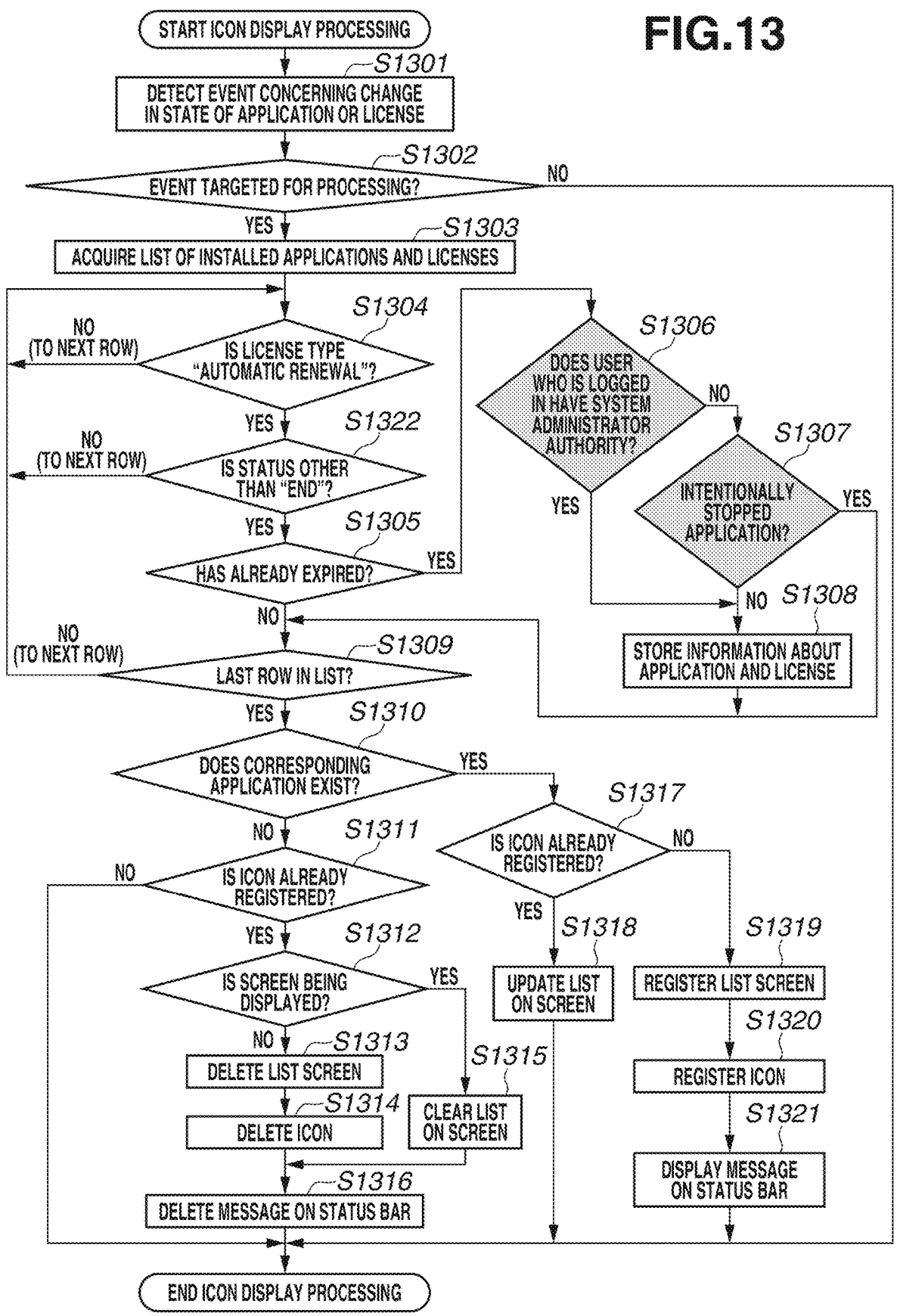
FIG. 13 is a flowchart illustrating a procedure for displaying an icon that indicates the expiration of a license.

FIG. 13 is a flowchart illustrating the flow of processing concerning display of the icon 507 and display of a message on the status bar 508 in the application selection screen 500 and display of a list in the list field 601, which are displayed on the display 205 of the image forming apparatus 101. In step S1301, the license state monitoring unit 307 receives a notification about an event concerning a change in state, such as start or stop, of an application or a change in state, such as application of a license or expiration of a license, using an event notification function of the application control unit 306, thus starting the processing in the present flowchart, and the processing then proceeds to step S1302. Processing in steps S1302 to S1304 and step S1322 is similar to processing in steps S702 to S704 and step S721 illustrated in FIG. 7, and is, therefore, omitted from the description.

If, in step S1305, the license state monitoring unit 307 determines that there is no valid license in the applied license information table as stored (YES in step S1305), the processing proceeds to step S1306, and, if there is a valid license (NO in step S1305), the processing proceeds to step S1309. In step S1306, the license state monitoring unit 307 determines whether the authenticated user who is logged in to the image forming apparatus 101 has the system administrator authority. If the authenticated user who is logged in has the system administrator authority (YES in step S1306), the processing proceeds to step S1308, and, if the authenticated user who is logged in does not have the system administrator authority (NO in step S1306), the processing proceeds to step S1307.

In step S1307, the license state monitoring unit 307 determines whether the reason for application stop stored in the auxiliary storage device 204 is an intentional stop. If the license state monitoring unit 307 determines that the reason for application stop is an intentional stop (YES in step S1307), the processing proceeds to step S1309, and, if the reason for application stop is not an intentional stop (NO in step S1307), the processing proceeds to step S1308. Proceeding to step S1309 means that the user is a general user and the license for the application which has been intentionally stopped by the user having the administrator authority is controlled in such a way as not to be renewed.

In step S1308, with respect to the application for which a valid license is not present, the license state monitoring unit 307 stores information including the application identifier, the product name, the use start date, and the use end date in the volatile memory 203, and the processing then proceeds to step S1309. At this time, in a case where processing in step S1308 has already been performed on the preceding row of the list, the above information is stored not in overwrite mode but as additional information.

In step S1309, the license state monitoring unit 307 determines whether the current row is the last row of the list, and, if a target row remains (NO in step S1309), the processing returns to step S1304 to perform the processing on the next row and, if no target row remains (YES in step S1309), the processing proceeds to step S1310. Processing in steps S1310 to S1321 is similar to processing in steps S708 to S719, and is, therefore, omitted from the description. Thus far is the description of the second exemplary embodiment.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-032475 filed Feb. 23, 2016, which is hereby incorporated by reference herein in its entirety.

What is claimed is:

1. A system comprising:
a license management server and an information processing apparatus,
wherein the license management server comprises one or more first memories storing first instructions and one or more first processors that, upon execution of the first instructions, cause the license management server to perform operations comprising:
generating a license file; and
wherein the information processing apparatus comprises a display device, at least one second memory storing second instructions, and at least one second processor that, upon execution of the second instructions, causes the information processing apparatus to perform operations comprising:
receiving the license file from the license management server,
validating an application corresponding to the license file by applying the license file at the information processing apparatus, wherein the license file is stored in the at least one second memory and associated with the application corresponding to the license file, and wherein the application corresponding to the license file extends a functionality of the information processing apparatus,
displaying, on the display device, an application-selection screen that includes a plurality of icons,
comparing a timing value set in the license file with a current time value to determine whether the current time value has exceeded the timing value set in the license file,
after a determination that the current time value has exceeded the timing value set in the license file as result of a comparison,
registering a screen for displaying a list of applications for which respective licenses have expired, wherein the list of applications includes the application corresponding to the license,
generating a new icon for the application corresponding to the license,
registering the new icon for the application corresponding to the license, wherein the new icon is an element of a graphical user interface, and
displaying the new icon for the application corresponding to the license file on the application-selection screen such that the application-selection screen includes the new icon in addition to the plurality of icons and the new icon is tied to the application-selection screen, wherein the new icon is configured to receive an instruction, from a user, for installing the new license file,
receiving, via the new icon, the instruction for renewing the license,
after the new icon receives the instruction for renewing the license,
sending a request, to the license management server, for a new license file to renew the application, wherein the new license file is different from the license file, and wherein the request includes an identifier of the application corresponding to the license file and includes an identifier of the information processing apparatus,
wherein the one or more first processors, upon execution of the first instructions, further cause the license management server to perform operations comprising:
generating the new license file based, at least in part, on information stored in the one or more first memories, wherein the new license file includes the identifier of the application corresponding to the license file, the identifier of the information processing apparatus, and an electronic signature, which is a certificate for verifying that the new license file is valid, and
after receiving the request, sending the new license file to the information processing apparatus, and
wherein the at least one second processor, upon execution of the second instructions, further causes the information processing apparatus to perform operations comprising:
acquiring the new license file from the license management server,
storing the new license file to update the license file stored in the at least one second memory with the new license file, and
and removing the new icon from the application-selection screen.

2. The system of claim 1, wherein the information processing apparatus is configured to perform at least one of a copy function, a print function, and a scan function.

3. The system of claim 1, wherein the license management server generates the new license file in response to receiving the request for the new license file.

4. The system of claim 1, wherein the license management server generates the new license file according to a license-renewal interval.

5. A method for controlling a license management server and an information processing apparatus that communicates with the license management server, which generates a license file used to validate, at the information processing apparatus, an application corresponding to the license file by applying the license file at the information processing apparatus, the method comprising:
generating, at the license management server, a license file;
receiving, at the information processing apparatus, the license file from the license management server;
validating an application corresponding to the license file by applying the license file at the information processing apparatus, wherein the license file is stored in at least one memory of the information processing apparatus and is associated with the application corresponding to the license file, and wherein the application corresponding to the license file extends a functionality of the information processing apparatus,
displaying, on a display device of the information processing apparatus, an application-selection screen that includes a plurality of icons;
comparing a timing value set in the license file with a current time value to determine whether the current time value has exceeded the timing value set in the license file;
after determining that the current time value has exceeded the timing value set in the license file as a result of the comparing, registering a screen for displaying a list of applications for which respective licenses have expired, wherein the list of applications includes the application corresponding to the license file, registering a new icon for the application corresponding to the license file, wherein the new icon is an element of a graphical user interface, displaying the new icon for the application corresponding to the license file on the application-selection screen such that the application-selection screen includes the new icon in addition to the plurality of icons and the new icon is tied to the application-selection screen, wherein the new icon, when operated, receives an instruction for installing a new license file;

after the new icon receives the instruction, sending a request, to the license management server, for the new license file to renew the application, wherein the new license file is different from the license file, and wherein the request includes an identifier of the application corresponding to the license file and includes an identifier of the information processing apparatus;

generating, at the license management server, the new license file based, at least in part, on information stored in the license management server, wherein the new license file includes the identifier of the application corresponding to the license file, the identifier of the information processing apparatus, and an electronic signature, which is a certificate for verifying that the new license file is valid, after receiving, at the license management server, the request, sending the new license file from the license management server to the information processing apparatus;

acquiring the new license file from the license management server; and storing the new license file to update the license file stored in the at least one memory with the new license file and removing the new icon from the application-selection screen.

6. The method of claim 5, further comprising:

after determining that the current time value has exceeded the timing value set in the license file as a result of the comparing, before acquiring the new license file from the license management server, sending a second request, to the license management server, for the new license file.

7. Non-transitory computer-readable storage media storing computer-executable instructions, wherein the non-transitory computer-readable storage media include a first non-transitory computer-readable storage medium storing computer-executable instructions that, when executed by one or more processors of a license management server, cause the license management server to perform a method comprising:

generating a license file used to validate, at an information processing apparatus, an application corresponding to the license file by applying the license file at the information processing apparatus; and wherein the non-transitory computer-readable storage media include a second non-transitory computer-readable storage medium storing computer-executable instructions that, when executed by one or more processors of the information processing apparatus that communicates with the license management server, cause the information processing apparatus to perform a method comprising:

displaying, on a display device of the information processing apparatus, an application-selection screen that includes a plurality of icons;

comparing a timing value set in a license file with a current time value to determine whether the current time value has exceeded the timing value set in the license file, wherein the license file is stored in at least one memory of the information processing apparatus and is associated with the application corresponding to the license file;

after determining that the current time value has exceeded the timing value set in the license file as a result of the comparing, registering a screen for displaying a list of applications for which respective licenses have expired, wherein the list of applications includes the application corresponding to the license file, registering a new icon for the application corresponding to the license, wherein the new icon is an element of a graphical user interface, and displaying a new icon for the application corresponding to the license file on the application-selection screen such that the application-selection screen includes the new icon in addition to the plurality of icons and the new icon is tied to the application-selection screen, wherein the new icon, when operated, receives an instruction for installing a new license file;

after the new icon receives the instruction, sending a request, to the license management server, for the new license file to renew the application, wherein the new license file is different from the license file, and wherein the request includes an identifier of the application corresponding to the license file and includes an identifier of the information processing apparatus;

wherein the method performed by the license management server further comprises:

generating the new license file based, at least in part, on information stored in the license management server, wherein the new license file includes the identifier of the application corresponding to the license file, the identifier of the information processing apparatus, and an electronic signature, which is a certificate for verifying that the new license file is valid, and after receiving the request, sending the new license file to the information processing apparatus; and wherein the method performed by the information processing apparatus further comprises:

acquiring the new license file from the license management server; and storing the new license file to update the license file stored in the at least one memory with the new license file and removing the new icon from the application-selection screen.

8. The method of claim 6, further comprising:

before acquiring the new license file from the license management server, determining that a predetermined amount of time has passed after sending the second request and that the new license file has not yet been acquired from the license management server; and before acquiring the new license file from the license management server, in response to determining that the predetermined amount of time has passed after sending the second request and that the new license file has not yet been acquired from the license management server, sending a third request, to the license management server, for the new license file.

* * * * *